United States Patent
Voit et al.

(10) Patent No.: US 6,424,657 B1
(45) Date of Patent: Jul. 23, 2002

(54) TRAFFIC QUEUEING FOR REMOTE TERMINAL DSLAMS

(75) Inventors: Eric A. Voit, Bethesda; Robert T. Baum, Gaithersburg, both of MD (US)

(73) Assignee: Verizon Communications Inc., New York, NY (US)

( * ) Notice: Subject to any disclaimer, the term of this patent is extended or adjusted under 35 U.S.C. 154(b) by 0 days.

(21) Appl. No.: 09/745,467

(22) Filed: Dec. 26, 2000

Related U.S. Application Data

(63) Continuation-in-part of application No. 09/635,695, filed on Aug. 10, 2000, and a continuation-in-part of application No. 09/688,213, filed on Oct. 16, 2000.

(51) Int. Cl.[7] .............................................. H04L 12/28
(52) U.S. Cl. ........................................ 370/412; 270/420
(58) Field of Search ................................ 370/230, 231, 370/235, 389, 392, 395, 396, 399, 401, 412, 413, 420, 428, 429, 230.1

(56) References Cited

U.S. PATENT DOCUMENTS

| | | |
|---|---|---|
| 5,247,347 A | 9/1993 | Litteral et al. |
| 5,410,343 A | 4/1995 | Coddington et al. |
| 5,600,632 A | 2/1997 | Schulman |
| 5,604,735 A * | 2/1997 | Levinson et al. ........... 370/360 |
| 5,621,728 A | 4/1997 | Lightfoot et al. |
| 5,623,603 A * | 4/1997 | Jiang et al. .................. 709/207 |
| 5,765,032 A * | 6/1998 | Valizadeh ................... 709/235 |
| 5,790,522 A * | 8/1998 | Fichou et al. ................ 370/236 |
| 5,790,548 A | 8/1998 | Sistanizadeh et al. |
| 5,812,786 A | 9/1998 | Seazholtz et al. |
| 5,905,781 A | 5/1999 | McHale et al. |
| 5,958,016 A | 9/1999 | Chang et al. |
| 5,999,518 A * | 12/1999 | Nattkemper et al. ........ 370/258 |
| 6,028,846 A | 2/2000 | Cain |
| 6,067,301 A * | 5/2000 | Astresh ....................... 370/418 |
| 6,081,517 A | 6/2000 | Liu et al. |
| 6,256,315 B1 * | 7/2001 | Barbas et al. ............... 370/412 |

* cited by examiner

Primary Examiner—Alpus H. Hsu
Assistant Examiner—Roberta Stevens
(74) Attorney, Agent, or Firm—Leonard C. Suchyta; Loren Swingle

(57) ABSTRACT

Offering vertical services to subscribers and service providers is an avenue to immediately improve the competitiveness of digital subscriber line access service, for example of the type offered by a local exchange carrier. To deliver high-quality vertical services, however, the underlying ADSL Data Network (ADN) or the like needs to establish Quality of Service (QoS) as a core characteristic and offer an efficient mechanism for insertion of the vertical services. The inventive network architecture introduces QoS into the ADN, in a manner that enables the delivery of sophisticated and demanding IP-based services to subscribers, does not affect existing Internet tiers of service, and is cost-effective in terms of initial costs, build-out, and ongoing operations. The architecture utilizes a switch capable of examining and selectively forwarding packets or frames based on higher layer information in the protocol stack, that is to say on information that is encapsulated in the layer-2 information utilized to define normal connectivity through the network. The switch enables segregation of upstream traffic by type and downstream aggregation of Internet traffic together with traffic from a local vertical services domain. By implementing a two-tier queuing structure in the downstream direction, traffic with a virtual circuit and traffic between the different virtual circuits that are destined for the same downstream DSLAM can be prioritized according to service type and/or Internet Service Provider.

22 Claims, 9 Drawing Sheets

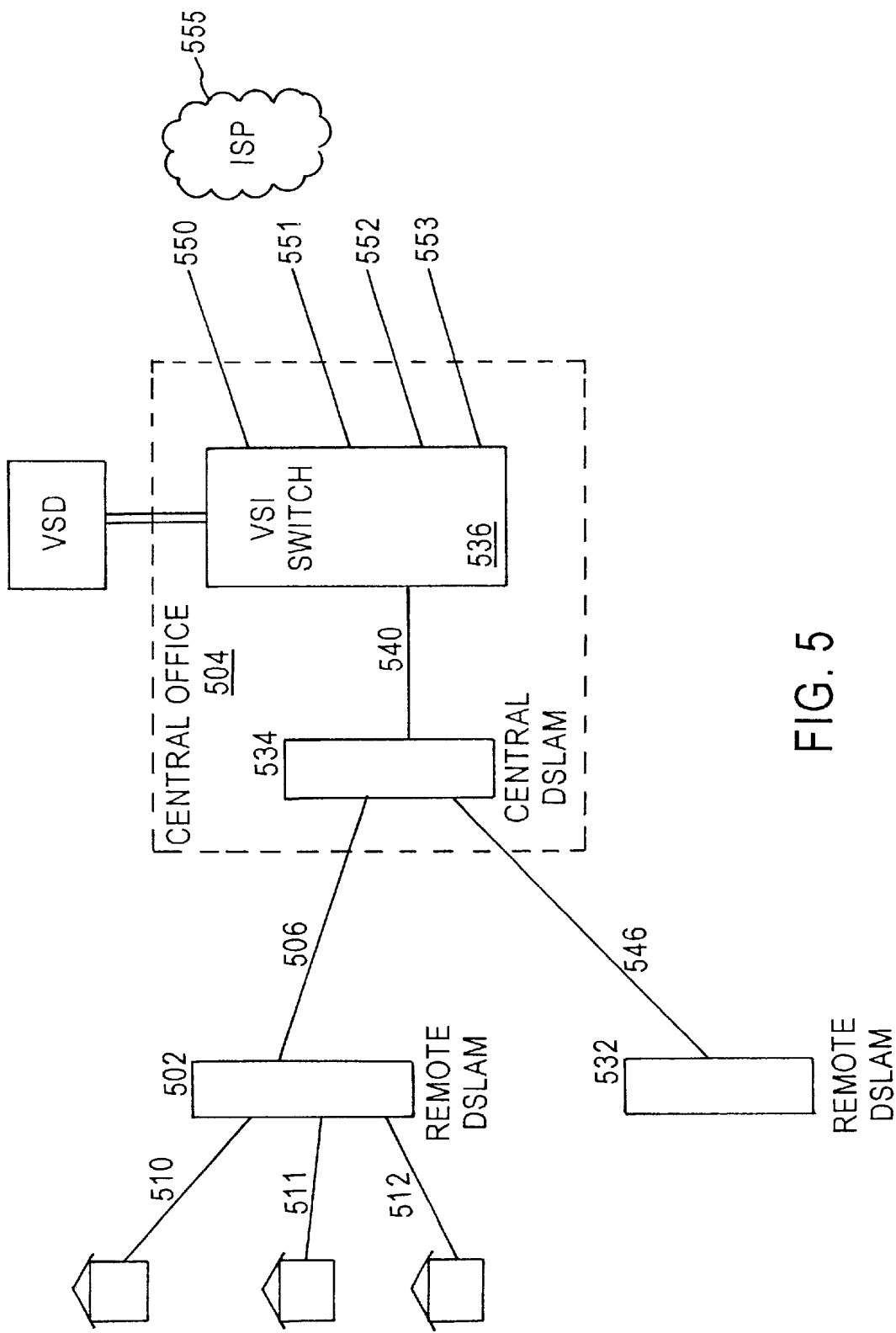

TRAFFIC QUEUEING FOR REMOTE TERMINAL DSLAMS

RELATED APPLICATION

This application is a continuation in part of U.S. patent application Ser. No. 09/635,695, filed Aug. 10, 2000 entitled "SUPPORT FOR QUALITY OF SERVICE ADN VERTICAL SERVICE IN DIGITAL SUBSCRIBER LINE DOMAIN" and U.S. patent application Ser. No. 09/688,213 filed Oct. 16, 2000 entitled "CONGESTION AND THROUGH-PUT VISIBILITY AND ISOLATION", the disclosures of which are incorporated herein entirely by reference.

FIELD OF THE INVENTION

The concepts involved in the present invention relate to techniques for implementing data communication services, for example in a local access network utilizing digital subscriber line technology, to support quality of service (QoS) and local introduction of vertical services. Other concepts involved in the present invention relate to regulating downstream traffic, for example, traffic going to a remote terminal DSLAM.

BACKGROUND

Modern society continues to create exponentially increasing demands for digital information and the communication of such information between data devices. Local area networks use a network, cable or other media to link stations on the network for exchange of information in the form of packets of digital data. These networks have proven quite successful in providing data communications in commercial applications. However, the common local area network architectures require installation of specialized wiring and use of specific wiring topologies. For example, the most popular network protocols, such as Ethernet, require special rules for the wiring, for example with regard to quality of wire, range of transmission and termination. Furthermore, to extend communications to a wider domain still requires connection of at least one node of the local area network out to a wider area network, such as the network of an Internet Service Provider (ISP). High speed links enabling such wide area access from a LAN domain, for example using Tl lines, are quite expensive and justified only for hi-end commercial users.

The most common form of computer-to-computer communication in use today, particularly for wide area communications, still relies on modems and analog telephone network connections. The telephone-based operation provides the voice grade analog modem a unique power, the necessary connections are virtually ubiquitous. Such modems can communicate via almost any telephone line or wireless telephone (e.g. cellular) to any other such telephone connection, virtually anywhere in the world. The telephone network, however, was designed to provide approximately 3.3 kHz of analog voice bandwidth. Consequently, the data rates that are possible through the telephone network are quite low. Even with a variety of recent enhancements, the data speeds remain at or below 56 kbps.

Integrated Services Digital Network (ISDN) offers somewhat faster data communications and the capacity for concurrent data and voice telephone services. The 160 kb/s capacity carries two bearer (B) channels, each at 64 kb/s, one data (D) channel at 16 kb/s and overhead information in a 16 kb/s embedded operations channel (EOC). The two B-channels may be used separately, for example for one voice telephone call and one data communication session. The D-channel typically is used for signaling, for call set-up and the like. Some applications allow aggregation of the channels, to combine the B-channels and possibly the D-channel to provide data communications up to the combined rate of 144 kb/s. However, these data rates offered by ISDN already are too slow for many multimedia applications. The high-speed and wide availability of modem personal computers (PCs) continually gives rise to ever more sophisticated multimedia applications. Communications for such applications, typically between the PC and the Internet, already are driving the need for speed to rates far above those available on normal ISDN lines.

A number of technologies are being developed and are in early stages of deployment, for providing substantially higher rates of data communication, for example ranging form 640 kb/s to 7.1 Mb/s. For example, cable television companies are now beginning to offer 'cable modem' services, which allow customers to communicate data over available bandwidth on the coaxial cable of a cable television network. After considering several other options, a number of the local telephone carriers are working on enhancements to their existing copper-wire loop networks, based on various xDSL technologies.

The term xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

The telephone carriers originally proposed use of ADSL and similar high-speed technologies to implement digital video services, for example in networks sometimes referred to as video 'dialtone' networks. The ADSL line technology provided a mechanism for high-speed transport of MPEG encoded video information to video terminal devices in the customers' homes. Examples of such ADSL-based video dialtone networks are disclosed in U.S. Pat. Nos. 5,247,347, 5,410,343 and 5,621,728. The carriers are now deploying a range of xDSL data services targeted at high-speed Internet access and high-speed access to private data networks. U.S. Pat. No. 5,790,548 to Sistanizadeh et al. discloses an example of an ADSL based data network, e.g. for high-speed access to the Internet and to corporate LANs.

The current design goals of DSL data networks for Internet access do not support high-end vertical services, that is to say services demanding IP-based applications that require assurance of some level of quality of service (QoS). For example, packet-switched Voice over IP (VoIP) requires low latency, low jitter (i.e., a relatively constant bit rate), and non-correlated packet loss. Streaming video has similar requirements, and in addition, requires high bandwidth. DSL data networks designed to support high speed Internet and Intranet access have been optimized to support traffic that is bursty and is not sensitive to latency or jitter. For example, current implementations supporting ATM cell traffic employ the Unspecified Bit Rate (UBR) class of service, which does not provide any bandwidth or delay guarantees. Consequently, transport of video materials through such DSI, data networks inflicts video delays, loss of audio/video synchronization, and image fragmentation.

Furthermore, lengthy bandwidth intensive sessions for video or other broadband applications may degrade the throughput to all other subscribers served through a shared node, such as a gateway router or a concentrated link. For two-way video, upstream will have even worse quality and throughput problems, due to the best effort nature of the DSL data network implemented for Internet access and because the upstream bandwidth is significantly less than that of the downstream channel.

To appreciate the situation and problems, it may be helpful here to consider an ADSL data implementation of a local access network, as a representative example, in somewhat more detail. FIG. 7 is a block diagram of a typical ADSL data network of the type currently in-use by a number of incumbent and competitive local exchange carriers to provide high-speed access to Internet Service Providers (ISPs) and thus to the Internet. FIG. 8 provides an alternative functional illustration of the elements of such a network. Of particular note, FIG. 8 shows the various protocol stacks in association with the appropriate network elements.

As shown in FIG. 7, a central office (CO) 100 provides plain old telephone service (POTS) and digital subscriber line data service for a number of customers. For purposes of discussion, assume that the equipment at each of the various customer premises 200 connects directly to the CO 100 via twisted pair type copper wiring 300. In an actual implementation, many customers may connect through such wiring to a remote terminal linked to the CO via optical fiber.

At each customer premises 200 in our example, the copper loop 300 carrying both the POTS and ADSL signals connects through a Network Interface Device (NID) 201 placed at the side of the home. A two pair loop is installed from the NID to the location where the ADSL unit 203, typically an ATU-R modem, is located in the home. One pair connects all of the signals on the line 300 from the NID 201 to the ADSL modem 203. Within the ATU-R type modem 203, a passive splitter/combiner type filter segregates the POTS signal and the data signals. The POTS signal is transmitted over the second twisted pair back to the NID 201. The POTS line is then connected to the in-home wiring extensions at the NID 201, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 or other data device (FIG. 8) also sends data to the ADSL modem 203. The modem 203 modulates the upstream data and transmits appropriate signals over the line $300_1$, or $300_2$, to the corresponding modem $113_1$, or $113_2$ in the CO 100 (FIG. 7). The ATU-R interface may support bridging, such that multiple users can share the ADSL modem 203, for two-way data communication through the CO 100.

The lines 300 for the customer premises 200 connect through the main distribution frame (MDF) 101 to a Digital Subscriber Line Access Multiplexer (DSLAM) 111. The DSLAM includes a bank of ADSL terminal units of the type intended for central office applications, identified as ATU-Cs 113. The DSLAM also includes a multiplexer/demultiplexer (MUX) 115.

Within the DSLAM 111, each customer line 300 connects to an assigned ADSL terminal unit 113 in the central office (ATU-C). In the example illustrated, the first customer's line $300_1$ connects through the MDF 101 to a first ATU-C $113_1$ in the CO 100. The second customer's line $300_2$ connects through the MDF 101 to a second ATU-C $113_2$ in the CO 100. The ATU-C type ADSL units 113 include appropriate frequency dependent combiner/splitters, for segregating out the voice telephone traffic. Thus each ADSL unit 113 provides a connection for telephone traffic from the associated line 300 to the POTS switch 103.

The ADSL units 113 in the CO (ATU-Cs) essentially act as modulator/demodulators (modems) for sending and receiving data over the subscriber telephone lines 300. On the network side, each of the ATU-Cs 113 connects to the MUX 115. The MUX 115 multiplexes and demultiplexes the upstream and downstream data for the ADSL modems 113 and provides a connection to a high-speed link 119. Through subtending, the MUX 115 may also provide a data concentration for the communications over the link 119.

In a typical implementation, the concentrated data communications utilize a DS-3 link 119. However, because of increasing traffic demands, it is becoming necessary to upgrade the link 119 to SONET optical fiber, such as OC-3 or in some cases even OC-12. The link 119 provides two-way data communication between the central office 100 and a data hub 121. In practice, this is a relatively long or wide area link using expensive interoffice facilities.

On the upstream side, the high-speed interoffice link 119 terminates on an ATM switch 123 for the ADSL data network (ADN). Although only one link 119 appears in the drawing, the asynchronous transfer mode (ATM) switch 123 will typically service a number of DSLAMs 111 in various end offices via similar DS or OC links. The ATM switch 123, in turn, provides a high-speed connection to a gateway router 125 coupled to an ATM cell relay network 129. Typically, the ATM switch 123 will aggregate traffic from a number of such links 119 onto an OC-3 or higher rate SONET link to the router 125. The router 125 and the cell relay network 129 enable transport of ATM cells for the subscribers to and from equipment of one or more Internet Service Providers (ISPs), shown by way of example as a concentrator 131 coupled to the public packet switched network commonly known as the Internet 132.

The illustrated local access type ADN network provides ATM cell transport from a customer premises 200 to the ISP concentrator 131. The ATM cells serve as the layer-2 routing or switching protocol for the lowest level definition of connectivity between two points of the network. Higher level protocols ride within the ATM cells.

The ATU-Rs 203 and the customer premises data equipment 215 connect via an Ethernet coupler. The customers' equipment communicates across the ADSL data network utilizing Ethernet, and the wide area communication involves transport of Internet protocol information typically in TCP/IP frames within Ethernet frames. The Ethernet frames carrying the TCP/IP frames are adapted into ATM cells. Attention is directed to the protocol stacks illustrated in the lower half of FIG. 8.

To efficiently provide cell relay, each customer is assigned an ATM virtual circuit that extends from the ATU-R 203 in the respective customer premises 200 to the gateway router 125. Although it was originally envisioned that ATM would support switched logical channels or virtual circuits, to date, such logical switching has proven impractical to implement and administer. Consequently, current practical ATM networks actually utilize permanent virtual circuits, not switched virtual circuits. For a given subscriber, the carrier therefore provisions an ATM permanent virtual circuit from the ATU-R 203 to the gateway router 125. The carrier programs one or more nodes along the path of that logical circuit, particularly the DSLAM 111, to regulate traffic on the virtual circuit to the upstream and downstream rates corresponding to the grade of service to which the particular customer subscribers. All data traffic for the subscriber goes over the entire length of the permanent virtual circuit, and most if not all nodes along that path limit that traffic to the rates of the subscription as defined in the provisioning data.

The virtual circuit may be thought of as a solid pipe. All traffic passes through the entire length of the pipe-like virtual circuit, regardless of how many switches or other nodes the circuit passes through. The layer-2 protocol defining the circuit carries all of the higher level traffic end-to-end. Higher layer protocols are visible only at the ends of the pipe. Hence, any traffic flow processing intended to utilize the higher layers must occur at some point past one end or the other end of the virtual circuit.

The gateway router 125 also terminates permanent virtual circuits through the cell relay network 129 going to/from the ISP concentrators 131. The gateway router 125 aggregates traffic between a number of subscribers and each respective ISP. The ISP equipment 131 typically implements a variation of a point-to-point protocol (PPP) specifically adapted to ride over Ethernet, referred to as "PPP over Ethernet" (PPPoE). The virtual circuits to the ISPs, however, do not have sufficient capacity to simultaneously carry all subscriber traffic at the maximum rates of the customers' subscriptions. The MUX 115, the ATM switch 123, and the gateway router 125 concentrate and regulate the subscriber traffic going to and from the ISPs, typically on some type of "best efforts" basis.

In a typical Internet access service offering, the most expensive service tier provides 7.1 Mbps for downstream communication and 680 kbps for upstream communication. The next grade of service provides 1.6 Mbps for downstream communication and 90 kbps for upstream communication, whereas the lowest tier of service provides 640 kbps for downstream communication and 90 kbps for upstream communication. The maximum grade of service offered to an individual subscriber depends on the rates for which the subscriber's line can qualify, although the subscriber may opt for a lower rate service since the higher-rate service is more expensive.

The approach outlined above relative to FIGS. 7 and 8 works well for Internet access if the traffic relates to web access, file transfers and the like, which do not require guaranteed quality of service. Various segments of the Internet industry, however, are rapidly developing new multimedia services and applications that already are pushing the capabilities of such a network. For example, increasingly, Internet traffic includes a number of types of communication that require a guaranteed quality of service. Voice telephone communication over IP is extremely sensitive to latency and jitter. The permanent virtual circuits provide an unspecified bit rate (UBR) service and do not guarantee any minimal amount of delay or jitter. Also, because the rates are set by subscription, the service tends to be relatively inflexible. Some services, such as multicasting of broadband information from the Internet into the local access ADN for a large number of concurrent users, can quickly overload one or more nodes or critical links of the network, for example the link 119 between the DSLAM 111 and the ATM switch 123 at the hub 121.

Most industry experts propose to increase the services available via the public Internet. However, because the higher layer protocols are visible only on the Internet side of the virtual circuit "pipe," these services all must be implemented out past the end of the virtual circuit, at least behind the gateway router 129 and most likely in the public network, where it is possible to view and route based on higher level protocols, particularly Internet protocol (IP). Such a migration strategy to implement new services creates severe problems. For example, in the network of FIG. 7, if a customer at premises 200, desired to order a video on demand, the customer would communicate via the assigned permanent virtual circuit and the ISP to a server on the Internet 132. The server would send the video stream back through the Internet 132, the ISP equipment 131, the cell relay network 129 and the virtual circuit from the router 125 to the ATU-R 203 for handoff to a PC or the like at 215. If the rate of the requested video exceeds the customer's subscription rate, the customer could not view the video in real time during the download. Even if the rate of the requested video is below the customer's subscription rate, loading in the Internet or the local access network may impose delays and/or jitter in communication of some segments of the requested video. Assuming that the hub 121 and the links 119 implement a subscriber concentration, ordering of videos or similar broadband files from the Internet 132 quickly consumes the shared resources through the hub 121 and the links 119, reducing the rates of service provided to other customers seeking concurrent Internet access.

It might be possible to increase the capacity of the links 119 and/or the hubs 121; however, this tends to increase the carrier's recurring costs and often makes the overall service (s) of the ADN network economically impractical.

It has also been suggested to provide customers guaranteed quality of services for some portion of their communications, by segregating the traffic carried between the customer premises and the hub 121. This would require assigning a plurality of ATM permanent virtual circuits to each subscriber, one for each different guaranteed level of quality of service and one for all other Internet traffic for the subscriber. Administration and provisioning of one virtual circuit per subscriber is already complicated, and the number of virtual circuits through any given ATM node is limited by current equipment designs. Expanding the number of permanent virtual circuits per subscriber to support multiple QoS tiers of service therefore would be quite expensive, and the management thereof would become a nightmare. To support an increased number of virtual circuits, many having guaranteed QoS requiring some substantial minimum rate at all times, would also require that the operator substantially upgrade the network to increase the end-to-end capacity all the way to the wide area network 132.

Furthermore, to actually receive the desired QoS requires that all elements involved in the communication must guarantee the desired level or quality of service. For communications across the public Internet 132, this means that various nodes and links on the public Internet must be available and capable of providing a guarantee of the desired QoS. In point of fact, few nodes on the public Internet actually support any type of QoS. Hence, even if the ADN supported a desired QoS, most subscribers would not benefit from that service because their communications over the public Internet would have no QoS guarantee, and would suffer from the usual problems of latency and jitter.

Consequently, current deployments of ADSL-based data networks, such as shown in FIGS. 7 and 8 generate many customer complaints. From the customer perspective, the service does not deliver the data rates that the customer pays for on a consistent basis. The customer typically blames such problems on network equipment failure. In fact, most of the problems already are due to virtual circuit congestion problems, of the kinds outlined above. Essentially, the ADN network is crippled by the unpredictable nature of the service levels that the customers perceive due to congestion on the ADN and on the public Internet.

Another area of problems is that the ADN does not offer the carrier any technique for offering its own differentiated service applications. To compete with other service providers, the carrier operating the ADSL-based data network needs to introduce its own multimedia services, for example, its own video services to compete with video services of cable television companies (that offer competing Internet access services). As noted above, however, introduction of a new service, such as true video on demand or broadcast video requires communications via the public Internet 132. This is true even if the carrier operating the network of FIGS. 7 and 8 wanted to initiate its own video service(s).

Some arrangements of equipment for providing xDSL connectivity to subscribers use a remote terminal DSLAM (RTDSLAM) located between the central office DSLAM and the subscribers' ATU-R. In such an environment, downstream congestion can occur at the RTDSLAM resulting in downstream cells being unexpectedly dropped. A comprehensive approach to improving the ADN service should also provide a method of prioritizing downstream data so that downstream high-priority cells through an overburdened RTDSLAM are not dropped while lower priority cells continue to be delivered.

Hence, there is an ongoing need to improve the architecture and operation of a digital subscriber line data communication network, particularly to facilitate finer gradation of services within the local network. The need, first, is for such a local network to support introduction of services on a 'vertical' basis within the local access network separate and apart from the common forms of Internet traffic, both for commercial differentiation and for increased security. In a related need, the local network needs to support a number of different levels of quality of service (QoS). Any enhancement to the network should also fulfill the need to shape downstream traffic through an RTDSLAM and provide for different tiers of service for subscribers.

SUMMARY OF THE INVENTION

A general objective of the invention is to implement an enhanced digital communication network for subscriber lines that supports vertical introduction of new communication and/or multimedia services.

A further objective is to support multiple levels or grades of quality of service within the access network.

Another objective of the invention relates to improvement of the cost effectiveness of the data network, for example, by reducing the demand for high-capacity interoffice links while increasing the bandwidth available at the network edge for at least some types of services.

A related objective is to provide a technique for introduction of new high-end services near the network edge, from a domain that is more secure and therefore less subject to hacker attacks.

A further objective of the invention is to support QoS and/or local introduction of vertical services, without the need to assign multiple virtual circuits or the like to each subscriber.

A further objective of the preferred embodiment is to support different priority levels of downstream traffic within a permanent virtual circuit (PVC).

An additional objective of the preferred embodiment is to support different tiers of downstream service among different PVCs.

A further objective of the preferred embodiment is to shape traffic to an RTDSLAM so that cells are not dropped in a first-come, first-served manner at the RTDSLAM.

Aspects of the invention relate to unique methods and network architectures for providing a combination of wide area internetwork service and vertical communication services via a local access network. Other aspects of the invention relate to a particular switch developed to facilitate a unique form of routing, for example to support of QoS and vertical service insertion.

The preferred embodiments alleviate the above noted problems by providing an intermediate node, typically an enhanced switch, to segregate upstream traffic based on analysis of the type of communication. This analysis utilizes protocol information contained in each communication, for a protocol higher than the switching protocol, that is to say higher than a protocol used to define the customer's logical circuit. In an implementation utilizing ATM, for example, the logical circuit is a virtual circuit, and the node examines the protocol information for layers above the ATM layer. One type of traffic remains on the virtual circuit, whereas other traffic is handed off to a vertical services domain. The node also provides a point to aggregate traffic from the from the vertical services domain with other traffic on the subscriber's logical circuit, for transport to the customer premises equipment.

To this end, the preferred embodiments use an ATM switch having routing/processing capabilities at the higher layer, for example at the layer-3 protocol or above, in close proximity to a DLSAM. The links between the DSLAM and this switch can be of any desired high capacity because they are short and therefore relatively low in cost. Consequently, the DSLAM and the new ATM switch can support relatively high bandwidth from that node to the customer premises. To utilize the increased bandwidth and support new services, the modems on the opposite ends of the digital subscriber line negotiate and operate at the maximum rate that the line conditions will permit.

The ATM switch essentially subdivides the traffic associated with each subscriber line. One branch goes to a gateway router and hence to one or more ISP(s) at the rate corresponding to the Internet access subscription. It may be helpful to consider this as long distance or wide area traffic for the subscriber. The other branch is for local traffic, to and from the locally connected vertical services domain. The interconnection to the ISP domain supports QoS in the downstream direction. Also, the interconnection to the vertical services domain supports QoS and introduction of vertical services not easily provided from the public Internet, such as video on demand, multicasting, and voice over IP. The vertical services domain is relatively secure since it is not accessible from the public Internet.

In operation, the access network will still support a logical circuit in the form of a virtual circuit to the gateway router for each customer, for example in the form of an ATM permanent virtual circuit. That circuit is provisioned for the subscriber's desired grade or quality of Internet access service. The subscriber line, however, supports at least the same and often a higher rate service, for example via rate-adaptive ADSL communication over a twisted wire line. In the upstream direction, the ATM switch examines at least one aspect of each data transmission relating to a logically higher level of protocol, e.g. in a layer 2 protocol encapsulated in ATM, or at layer 3, layer 4, or higher. From the higher level information, the switch determines the type of transmission and segregates the upstream transmissions on the subscriber's virtual circuit. One type of transmission continues on the virtual circuit, e.g. for Internet transport. Any and all other types, however, go to the vertical services domain. In the downstream direction, the ATM switch aggregates any communications coming from the vertical services domain together with downstream transmissions on the virtual circuit from the Internet.

The vertical services domain also represents a communication network. The vertical services domain, however, preferably takes the form of a data network optimized for local transport of vertically injected services, that is to say local data traffic. In view of its local nature, it is easier and more cost effective to provide high bandwidth services. The vertical services network, for example, could take the form of a giga-bit Ethernet type local area network. Also, it is easier to adapt the vertical services network to support service level agreements with customers with regard to quality of service. In many cases, it actually is sufficient to support QoS on the one hop through the ATM switch, itself.

To support the QoS requirements, a feature of the preferred embodiments involves certain queuing and tagging operations within the ATM switch. Essentially, the switch will maintain two or more queues for each permanent virtual circuit. The switch distinguishes the queues based on importance. As the switch receives cell transmissions for transport over the virtual circuit to the customer premises, the switch will internally tag each cell as to its importance level and place the cell in the appropriate queue. An access control list (ACL) is used to control servicing of the multiple queues for each PVC in order to transmit cells to a second tier queue. The particular ACL is selected to implement QoS in conformance with the subscriber's service level agreement with the carrier and/or agreements between the carrier and the vertical services and internet services providers. The second tier queue can then be serviced in accordance with downstream facility capacities.

Within the one virtual circuit assigned to the individual subscriber, the invention provides multiple tiers of service, preferably with multiple levels of QoS. Also, at different sections along the virtual circuit "pipe," the network provides different levels of rate shaping. All layers and all services are available at the home, but different services receive different treatments in the network conforming to the different levels of QoS. The inventive approach, however, does not require each subscriber to have multiple virtual circuits.

Services provided on the vertical services domain appear as IP data services. Virtually any communication service may utilize the vertical services network and through it to gain access to the carrier's local customer base, simply by providing an IP interface for coupling to the vertical services network. For example, it is a simple matter to connect any digital source of broadcast audio or video information, such as a direct satellite broadcast receiver system similar to those used today in residential applications, through an IP interface. Such a broadcast source and interface can provide the full range of received video services, over the vertical services network. The access data network may distribute the video programming to a number of access switches within a local geographic area. The switch provides an optimum point for frame or cell replication for multicasting services. Hence, in our video example, the switch replicates and distributes frames for the broadcast service over the digital subscriber line circuits to customers desiring to view the programming.

A computer readable medium, as used herein, may be any physical element or carrier wave, which can bear instructions or code for performing a sequence of steps in a machine-readable readable form. Examples of physical forms of such media include floppy disks, flexible disks, hard disks, magnetic tape, any other magnetic media, a CD-ROM, any other optical media, a RAM, a ROM, a PROM, an EPROM, a FLASH-EPROM, any other memory chip or cartridge, as well as media bearing software in a scannable format. A carrier wave type of medium is any type of signal that may carry digital information representative of the instructions or code performing the sequence of steps. Such a carrier wave may be received via a wireline or fiber-optic network, via a modem, or as a radio-frequency or infrared signal, or any other type of signal which a computer or the like may receive and decode.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 5 is block diagram of a portion of the network, useful in illustrating the location and function of a remote terminal DSLAM.

DETAILED DESCRIPTION OF THE PRESENTLY PREFERRED EMBODIMENTS

Figure 1:
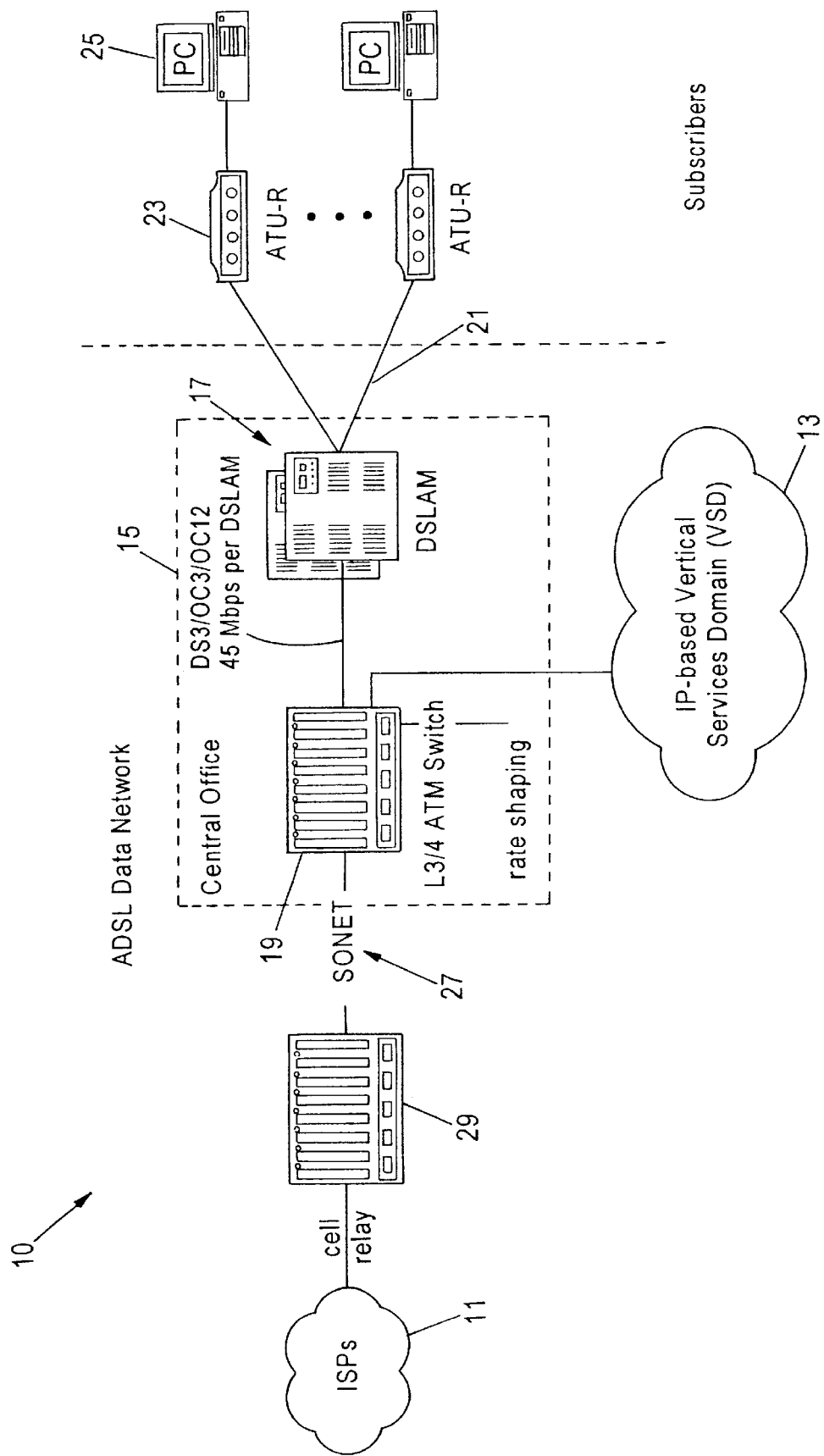
FIG. 1 is a functional block diagram of a digital subscriber line data network supporting enhanced services in accord with the inventive concepts.

The inventive network architecture introduces QoS into the ADN, in a manner that enables the delivery of sophisticated and demanding IP-based services to subscribers. The architecture does not affect existing Internet tiers of service such that the promised rates for such access appear the same as offered today. Also, the new architecture is cost-effective in terms of initial costs, build-out, and ongoing operations. The architecture utilizes an access switch or router capable of examining and selectively forwarding packets based on a relatively higher layer of the protocol stack, that is to say based on information encapsulated within the layer-2 information utilized as the lowest level definition of connectivity through the network. The access switch enables segregation of upstream traffic by communication type and downstream aggregation of wide area traffic together with traffic from a local vertical services domain.

In accord with the invention, the access switch examines the higher-level protocol information in the upstream communications to segregate traffic into two or more streams based on traffic type. A logical circuit provisioned for the subscriber extends from the customer premises through the switch to a node providing service to the packet switched network, typically on the Internet. The provisioning of this circuit defines a contiguous connectivity for the logical circuit, in the layer-2 protocol utilized by the network. Higher level protocols ride within this particular layer-2 protocol, including some protocols that are often considered themselves to be layer-2 protocols.

The analysis of upstream packets to determine higher-level type enables segregation of the upstream traffic into two or more upstream flows. For example, this allows the switch in the preferred embodiment to keep traffic bound for the packet switched internetwork on the logical circuit but route all other traffic onto another network, in this case a local network for vertical services. In the preferred embodiment, from the access switch or router to the packet switched network, the provisioning for the logical circuit limits the rate(s) of communication to those defined by the grade of service to which the customer subscribes. From the customer premises to the switch, however, the communications run at the optimum rates that the facilities can physically support, e.g. the maximum rates that the ADSL modems or the like can adaptively establish for the particular subscriber's line.

In the downstream direction, the switch aggregates traffic for each subscriber. The switch receives the rate-limited traffic from the packet switched network, on the subscriber's logical circuit. The switch also receives any downstream traffic intended for the subscriber, from the vertical services network. The switch combines this traffic and sends the combined communications downstream over the subscriber's logical circuit to the customer premises, at the optimum downstream rate that the subscriber's facilities can support.

In combining the traffic, within a virtual circuit, from the vertical services network and the packet switched network, a two-tier queuing operation can be utilized to prioritize the downstream traffic. The cells in each traffic stream can be examined at a layer above the data link layer to determine what type of application (e.g., voice, video, data, etc.) is associated with each cell. Using this information the cells can be prioritized into a first set of queues for each virtual circuit. Subsequently, using a rule-set or access control list (ACL), The switch can service the sets of queues for the various virtual circuits to populate a second tier queue set according to relative priorities between the different virtual circuits. Accordingly, the data exiting the second tier queue set is prioritized within each virtual circuit and between the different virtual circuits.

Figure 2:
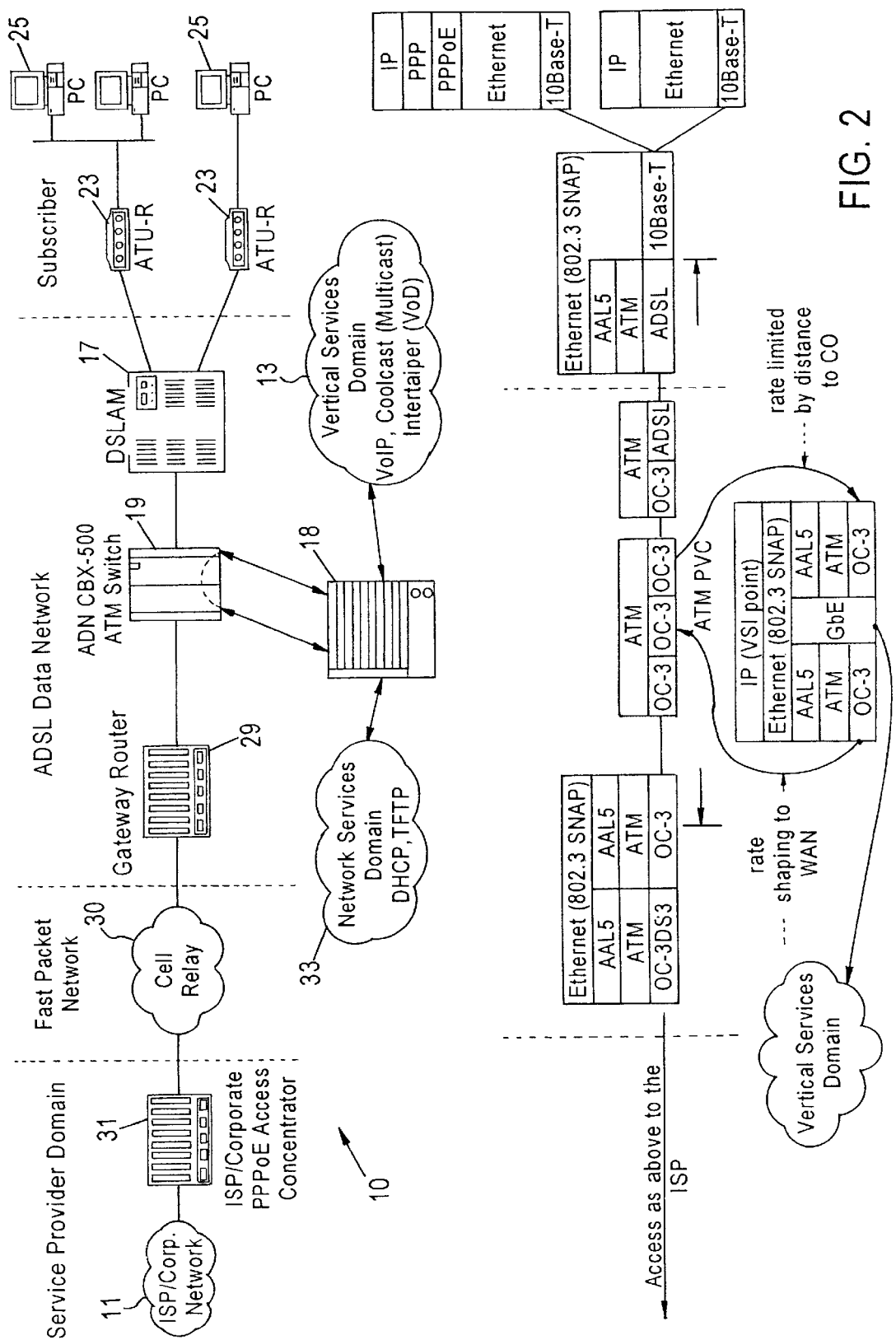
FIG. 2 is a slightly modified functional block diagram of network of FIG. 1, illustrating the protocol stacks used in the various network elements.

FIG. 1 provides a high-level functional illustration of an exemplary digital subscriber line network, specifically an ADSL data network 10, implementing the various concepts of the present invention. FIG. 2 provides an alternative functional illustration of the elements of such a network. Of particular note, FIG. 2 shows the various protocol stacks associated with the appropriate network elements that utilize those stacks. The end-user may be a single PC user or a small business or a residential LAN user. The data equipment of such users typically includes servers and PCs and may include a variety of other devices, such as fax machines, televisions, recorders and remote controlled appliances, having data communication capabilities.

The customer access link comprises an xDSL twisted pair, although those skilled in the art will recognize that the invention is readily adaptable to networks using other types of links to the subscriber premises. In the illustrated embodiment, the network 10 supports ADSL, which the carrier may offer in grades supporting 640 kbps, 1.6 Mbps or 7.1 Mbps (downstream) rates for Internet access. The actual communications over the DSL loops, however, run adaptively at the maximum rates that the line conditions allow.

The ADSL-based local access data network or "ADN" 10 provides access to two different network domains for communication services. The two network domains are logically separate. In most implementations, the first domain may be considered as a long distance or wide area domain, whereas the second domain is a local network domain. In the illustrated example, the ADN 10 provides access to a first domain in the form of a wide area internetwork, such as the public Internet, corporate local area networks (LANs), and the like, represented by the network cloud 11 for the ISPs. The high speeds available through the local network 10 enable a wide range of communications, for example, of text data, of video data, for multimedia, for web browsing, of transfers of files, for database searching, and the like via the network(s) 11.

In accord with the invention, the ADSL-based local access network 10 also offers access to a wide variety of other IP-based services through a local data network 13 serving as the vertical services domain (VSD). The vertical services typically are high-end services requiring certain QoS levels and often having a certain local characteristic. Examples of the vertical services are discussed in more detail later.

The vertical services network offers an efficient domain from which the carrier can locally inject high-end services and/or services of other local providers. Because the vertical services domain is separate from the public Internet, equipment providing the vertical services is subject to attacks directly from the public Internet.

As shown in FIGS. 1 and 2, a central office (CO) 15 comprises one or more DSLAMs 17 and L3/4 ATM switch 19. Elements of the CO 15 providing plain old telephone service (POTS) have been omitted for simplicity of illustration, since they are generally similar to those shown in FIG. 7.

The switch 19 is designated as an "L3/4" switch here as a matter of convenience, to illustrate that the switch 19 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by the preferred switch are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer.

Returning to the discussion of FIGS. 1 and 2, for purposes of this discussion, assume that the equipment at the various customer premises connect directly to the CO 15 via twisted pair type copper wiring 21. In an actual implementation, many customers may connect through such wiring to a remote terminal linked to the CO 15 via optical fiber. Other hardwired, optical or wireless implementations of the digital subscriber lines are discussed later. In the illustrated embodiment, each line 21 from a customer premises connects to an ATU-C within one of the DSLAMs 17.

On the customer premises side, the digital subscriber line circuit 21 connects to an ADSL terminal unit (remote) or ATU-R 23. The ATU-R 23 is a modulator/demodulator (modem) for communicating over a twisted wire pair type line 21, in accord with the ADSL protocols. The ATU-R in turn connects to customer premises equipment, shown by way of example as a PC 25 at each location (FIGS. 1 and 2). Those skilled in the art will recognize that the customer premises equipment 25 may include a wide range of other types of devices having data communications capabilities (see e.g., FIG. 3).

The ADSL user's normal telephone equipment (not shown) also connects to the line 21, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Such modems may implement either one of two techniques for dividing the usable bandwidth of the telephone line to provide these channels. One approach is to divide the usable bandwidth of a twisted wire pair telephone line by frequency, that is to say by Frequency Division Multiplexing (FDM). The other approach uses Echo Cancellation. FDM uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. With echo Cancellation, the upstream band and downstream band substantially over-lap. The modems separate the upstream and downstream signals by means of local echo cancellors, in a manner similar to that used in V.32 and V.34 modems.

The DSL modems may use a number of different modulation techniques to physically transport digital data streams. A number of implementations of the modems have used carrierless amplitude phase (CAP) modulation. Most current xDSL modems, however, utilize a discrete multi-tone (DMT) approach.

Figure 7:
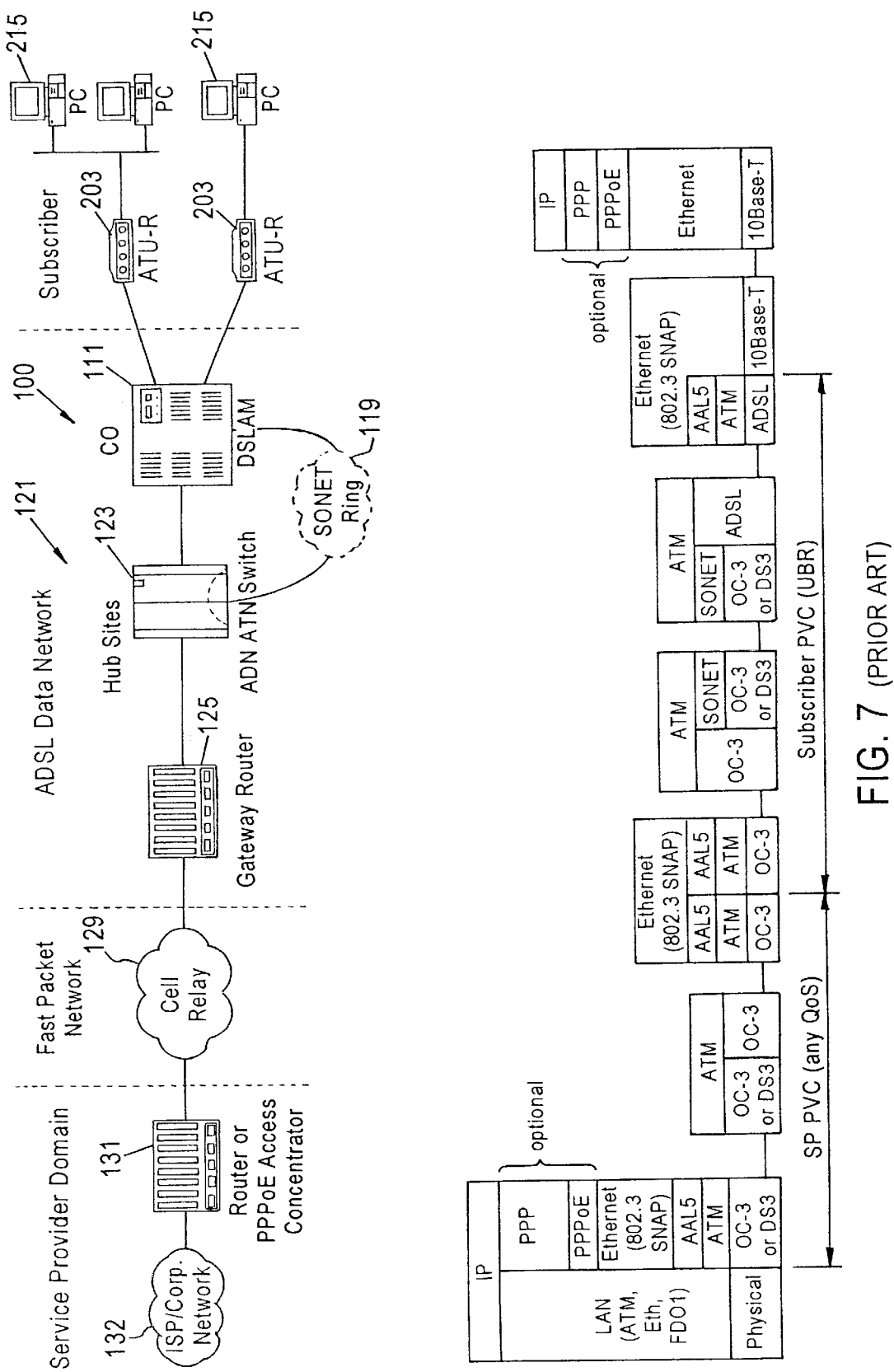
FIG. 7 a block diagram of a prior art asymmetrical digital subscriber line data network.
Figure 8:
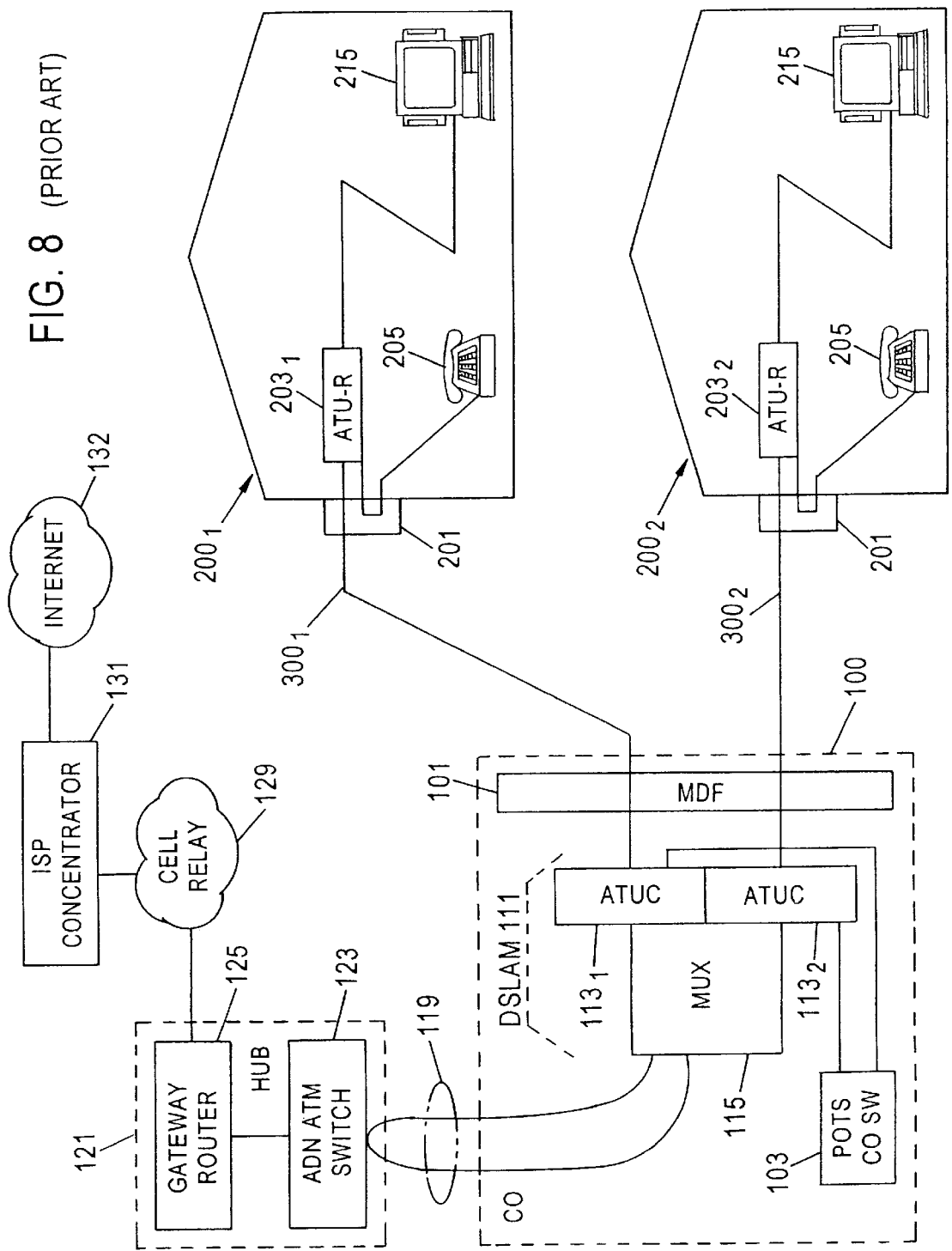
FIG. 8 is a slightly modified functional block diagram of the prior art network illustrating the protocol stacks used in the various network elements.

Returning to the discussion of the CO 11, the structure and operation of each DSLAM 17 is essentially the same as those of the DSLAM 111 in the embodiment of FIG. 7, except that the control functionality of the DSLAM 17 is somewhat different. The DSLAM 17 controls the ATU-Cs to implement a rate-adaptive ADSL service, to adapt operations so as to maximize data rates for the communications over the individual subscriber lines. Essentially, the ATU-Cs and ATU-Rs signal each other over the lines to synchronize their modes of operation at parameter settings, which achieve optimum data throughput. Also, the DSLAM 17 does not need to monitor or limit the line rates, but instead relies on the rate-adaptive control algorithm to maximize the rates achieved over the ADSL circuits or provide rate-shaping for the ATM virtual circuits. Other network elements limit rates, where necessary.

The L3/4 ATM switch 19 is co-located with the DSLAMs 17, within one central office 15. As a result, it is practical to connect the multiplexer within each of the DSLAMs 17 over a high-speed data link directly to an appropriate port of the ATM switch 19. Because these links are short, there is little or no cost imposed when implementing such links using wideband equipment. By itself, the co-location of the L3/4 ATM switch 19 with the DSLAM(s) 17 does not increase bandwidth. Rather, it makes increased bandwidth at the network edge economically feasible, due to proximity. Co-location removes the requirement to purchase expensive wide area transport (the SONET ring) to increase bandwidth. In particular, the direct OC3/OC12 connections between the DSLAM 17 and the L3/4 ATM switch 19 do not incur any recurring tariff expenses.

The ATM switch 19 connects through a SONET ring 27 to a gateway router 29 providing ATM transport through a cell relay network 30 (FIG. 2) to the ISPs shown at network 11 in the drawings. Most of the ISPs will utilize a concentrator or other equipment as their point of presence for Internet access (FIG. 2). In the preferred embodiment, the equipment 31 provides a point-to-point protocol (PPP) interface designed for transport over Ethernet (PPPoE). The ATM switch 19 also provides a connection to the local implementation of the VSD network 13, for example via a giga-bit Ethernet port to a switch or other local network elements 18.

The illustrated local access type ADN network 10 provides ATM cell transport from the customer premises to the ISP network(s) 11. The ATM cells serve as the layer-2 protocol for defining contiguous switched connectivity. Higher level routing protocols, such as Ethernet and TCP/IP frames, ride within the ATM cells. Services of different types utilize different protocols at one or more layers above the ATM cell layer. In the preferred embodiments, all communications utilize Ethernet. However, communications to and from the ISPs use the noted PPPoE type Ethernet protocol. In contrast, communications to and from the vertical services domain use one or more of the other Ethertype protocols.

To efficiently provide cell relay, each customer is assigned a virtual circuit that extends from the ATU-R 23 in the respective customer premises to the gateway router 29. This logical circuit is defined at the layer-2 protocol level. The present implementations implement this logical communication circuit as an ATM permanent virtual circuit, although the inventive concepts may apply to other types of logical circuits or channels.

The gateway router 29 is the communication node of the access network 10 providing access to the wide area IP packet networks, of corporations or more often of Internet Service providers. The gateway router 29 terminates permanent virtual circuits through the cell relay network 30, from the equipment 31 of each such wide area packet network provider 11. The gateway router 29 also terminates the permanent virtual circuits from the subscribers through the data network 10. For communication with a selected ISP network 11, for example, the gateway router 29 routes cells from the permanent virtual circuit from the subscriber through to the permanent virtual circuit of the selected ISP network 11. In the opposite direction, the gateway router 29 routes cells from the permanent virtual circuit from the selected ISP network 11 through to the permanent virtual circuit of the particular subscriber.

For the leg of the subscriber's logical circuit, extending from the L3/4 ATM switch 19 through the gateway router 29, the carrier programs one or more nodes along the path behind the DSLAMs 17, to regulate traffic on the virtual circuit to the rate corresponding to the grade of Internet access service to which the particular customer subscribes. In the preferred embodiment, at least one such node performing this rate shaping function is the L3/4 ATM switch 19. All traffic going to and from the ISP network(s) 11 therefore is still limited to the rates defined in the service level agreement (SLA) for Internet access that the carrier has with the particular customer.

The portion of the virtual circuit extending between the ATM switch 19 and the ATU-R 23, however, is not rate limited but instead runs at the maximum rate that the line will support using the rate-adaptive ADSL modem operation. In most cases, the rate-adaptive ADSL modem operation will support rates substantially higher than the subscription rate for Internet access service.

The L3/4 ATM switch 19 also provides the interconnection to the subscriber's virtual circuit for insertion of downstream traffic from the vertical services domain 13 and separation of upstream traffic from the subscriber's virtual circuit going to the vertical services domain 13. In accord with the invention, decisions as to whether upstream traffic is destined for the vertical services domain 13 or should remain on the subscriber's virtual circuit going through the gateway router 29 and the cell relay network 30 to the ISPs 11 is based on an analysis of traffic type. The traffic type analysis relies on protocol information contained in the communications, which relates to layers of the protocol stack that are higher than the layer-2 switching protocol, in this case above the ATM layer.

As shown in FIG. 2, traffic destined for an ISP 11 utilizes a variation of a point to point protocol (PPP) intended to run on top of Ethernet, referred to as PPP over Ethernet or "PPPoE." A 'type' indicator contained within the Ethernet frames identifies the PPPoE protocol. In contrast, traffic going to and from the vertical services domain utilizes other 'types' of Ethernet protocol. All traffic to and from the customer premises uses Ethernet frames carried within ATM cells.

The switch 19 therefore routes a subscriber's traffic going to and from an ISP 11, upon detection of the PPPoE indicator in the level 3 data contained within the Ethernet cells. This traffic will also utilize public IP addressing. In contrast, the ATM switch 19 routes a subscriber's traffic going to and from the vertical services domain, upon detection of any other type of Ethernet protocol at level 3 or above in the protocol stack. The IP addressing in the vertical services domain 13 utilizes private-IP addresses, for example, as administered with a DHCP server (not shown) coupled to the network cloud 33. Although shown separately, the cloud 33 may be implemented as a portion of the network providing the physical elements of the vertical services domain. The portion 33, however, would typically be a logically separate domain that the carrier controls and restricts for its own network administration use.

Figure 3:
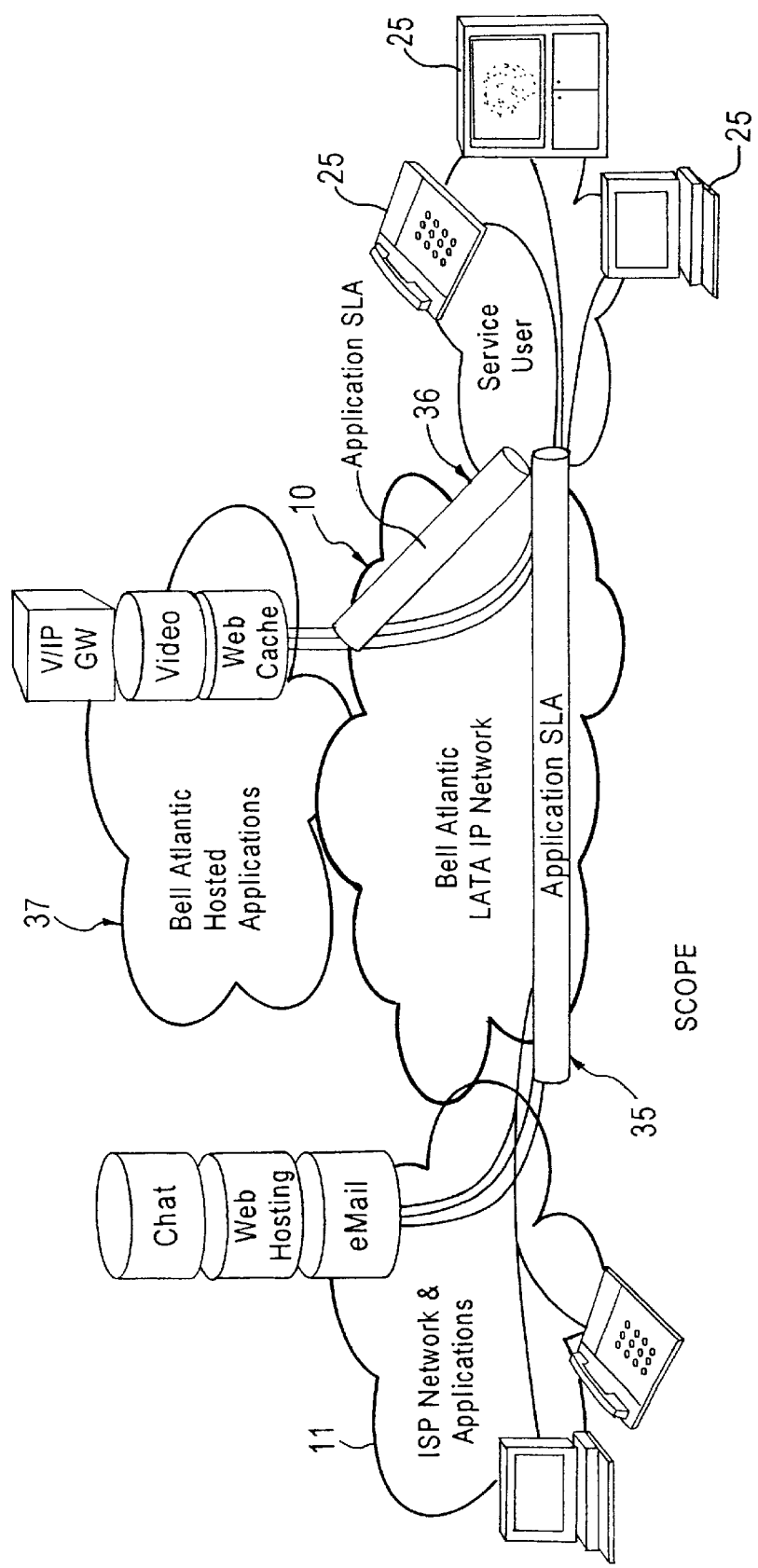
FIG. 3 is a functional block diagram of the network showing the service level agreements (SLAS) for which the network provides appropriate QoS.

FIG. 3 depicts the logical division of the subscriber's traffic, as implemented at the ATM switch 19 in accord with the invention. As shown, the network 10 provides a logical "pipe" or circuit 35 extending to the networks 11 of one or more of the ISPs, for an Internet access application. The ATM switch 19 (FIG. 1) preferably performs a rate shaping or control function. The leg 35 of the subscriber's traffic extending to the ISP 11 provides upstream and downstream communication rates conforming to a service level agreement (SLA) applicable to the subscriber's Internet access application. As such, the communications over the subscriber's logical circuit, extending from the switch to the ISP, provide a first level of QoS. To the subscriber, service over the leg 35 appears the same as a subscriber selected grade of Internet access service as provided by older ADN architectures. FIG. 3 illustrates chat rooms, web surfing and e-mail as examples of services an ISP might offer through the Internet Application SLA circuit 35 and the attendant portion of the subscriber's assigned logical circuit through the access network.

The network 10 also supports communications over one or more logical application paths 36 to local applications 37 hosted in the vertical services domain. Assuming that a subscriber with various equipment 25 also subscribes or otherwise participates in one or more of the vertical services, the local carrier (e.g. Bell Atlantic in FIG. 3) offers a corresponding number of additional application SLAs with the customer. Each SLA for a vertical service may specify QoS parameters for the particular application, such as rate/bandwidth, latency, jitter, packet loss, packet sequence, security and/or availability. Examples of such applications hosted in the carrier's vertical services domain 37 include the illustrated voice over IP service shown as a V/IP gateway, as well as video services and some caching for high volume local web services. Communications for such applications utilize the one or more paths 36.

The network of FIGS. 1 to 3 also supports closed or private user work groups or virtual local area networks (VLANs). VLANs, for example, may be implemented as a service hosted through the vertical services network 13. All traffic from customer premises belonging to one of the VLANs would include a VLAN Ethertype indicator. Since the frames would not be PPPoE type Ethernet frames, the switch 19 would route the upstream transmission to the vertical services network 13. VLAN frames also carry a VLAN identifier. The nodes of the network 13 transport the packets for the VLAN members only to resources that are members of the identified VLAN. In this manner, the capability exists for creating logical workgroups of users and their shared resources (servers, printers, etc.), that may be physically separated from each other. VLAN groupings can provide privacy and security to their members while enabling "broadcast domains" whereby broadcast traffic is kept logically "inside" the VLAN.

The present invention also supports segregation and aggregation of traffic for three or more domains, based on the higher-level traffic type analysis. An alternative implementation for closed user group services therefore might actually provide a third domain for such services. PPPoE traffic would go to the concentrator equipment 31, as discussed above. The switch 19 would route the upstream transmission frames bearing a VLAN Ethertype indicator to the alternate network serving as the VLAN service domain. That domain would process VLAN communications essentially as done in a normal switched Ethernet type network. Upstream transmissions that bear any other type of Ethertype indicator would go to the vertical services network 13, as in the earlier examples.

A feature of the switch, in accord with the invention, is that it prioritizes traffic for each customer to support QoS for the various services as required by service level agreements (SLAs) between the customer and the carrier. In this regard, one implementation of the L3/4 ATM switch 19 performs queuing and tagging operations in accord with the desired prioritization. The switch will maintain two or more queues for each subscriber's permanent virtual circuit. The switch distinguishes the queues based on importance or priority. As the switch receives cell transmissions for transport over the virtual circuit to the customer premises, the switch will internally tag each cell as to its importance level and place each cell in the appropriate queue based on the tag.

The tagging and prioritization may be based on traffic type or 'Type of Service' (ToS). Table 1 illustrates one example of the possible ToS levels that may be assigned to different communications.

tion device based rules) obtain access to the limited rate adaptive bandwidth available on any given subscriber's line. Also, the insertion point, switch 19, will usually sit behind the media conversion point (e.g., the DSLAM 17). An OC3 or other facility between the switch 19 and the DSLAM 17 also could become congested. Preferably, the switch 19 or other element at the insertion point queues the traffic in such a manner that no downstream facility (OC3) limitations (which are independent of the rate adaptive DSL loop limitations) will result in packets being dropped.

The queuing will be done based on customer and network provider determined rules so that contention for the facilities facing the subscriber will be addressed via the dropping of the appropriate packets. That way an inserted video stream doesn't overwhelm a PPPoE or Voice stream (due to facility

TABLE 1

| Relative Priority | ToS Value | AR Queuing | Customer Traffic Encapsulated TOS | Internal BA Mgmt Traffic Rewritten TOS |
|---|---|---|---|---|
| Critical Management | 0 | WFQ (Control 25%) | | OSPF, SNMP, ICMP, BGP |
| Future | 1 | | | |
| Real Time Interactive | 2 | WFQ (High 40%) | Port numbers identified | |
| IP Application Control | 3 | WFQ (Medium 30%) | ICMP, IGMP, EGP, DNS, H.323 signaling, BGP, SIP, Microsoft Media Player Streaming Media Control, RTSP | IGMP, RADIUS |
| One Way Streaming Media | 4 | | UDP (ports 1024+) | |
| One Way Batch | 5 | | HTTP, HTTPS, SNMP, Telnet | |
| Unknown | 6 | WFQ (Low 5%) | Other | Other |
| Non time sensitive | 7 | | FTP, TFTP, SMTP | |

The access switch 19 will examine the content of each communication and determine an appropriate ToS level, for example in accord with the table above. Based on the ToS level, the switch will add a tag to the cell(s) as part of its internal processing. Using the ToS tags, the switch will place each of the cells for a given subscriber into a corresponding one of a plurality of queues that the switch maintains for the subscriber's traffic.

The switch may implement any one of a number of different queue servicing algorithms to select and transmit cells from the various queues. For example, the switch 19 may implement one of several statistical algorithms, equal queuing, weighted queuing, priority selection from queues, etc. The particular algorithm is selected to implement QoS in conformance with the subscriber's service level agreements (SLAs) with the carrier. In most cases, particularly for service applications from the vertical services domain, the switch 19 will not normally drop any cells or packets. In the rare event that the switch 19 becomes congested, any dropping of cells is based on the priority level assigned to the frame, i.e., lowest priority first. Also, if the switch ever drops cells, it drops all cells for an effected lowest priority frame from the relevant queue.

The ability to prioritize traffic across the inserted streams and the PPPoE stream enables the operator to control flows through the ADN 10 so that the local access facility is not overwhelmed with content which exceeds its physical (rate adaptive) limitations. For example, the queuing rules preferably ensure that the 'proper' applications (based on inserlimitations). Among others, appropriate industry understood methods for accomplishing this queuing control include Weighted Fair Queuing (WFQ), Priority (PQ) Queuing, and Weighted Random Early Discard (WRED).

Also, the ability of the switch 19 to examine higher level information provides other advantages in network operations. For example, the switch can implement sophisticated filters on the higher level information, e.g., to provide security. As another example, the switch preferably performs measuring and monitoring to determine what if any packets get dropped (based on the physical rate adaptive limitations), and generates appropriate reports to an external operations system (not shown).

The introduction of the L3/4 ATM switch 19 in proximity to the DSLAM(s) 17 also provides benefits in terms of operation of the gateway router 29. Due to the end-to-end use of the Unspecified Bit Rate (UBR) PVCs, the gateway router interface to the cell relay network 30 has been engineered to support a maximum of 2000–4000 PVCs (end users). This is essentially an over-provisioning of bandwidth that probabilistically avoids service degradation that could result from simultaneous demand for bandwidth. The ability of the L3/4 ATM switch 19 to perform QoS and rate shaping essentially reduces or ever removes this concern, because it significantly reduces the risk that the gateway router 29 will become a bottleneck. As a result, the ADN 10 can increase bandwidth efficiencies for this interface. Further, the capacity through the gateway router 29 need not be upgraded as often to support demand for increased bandwidth associated with new bandwidth-intensive services, since many such services are now introduced through the vertical services domain 13 and the L3/4 ATM switch 19.

Figure 4:
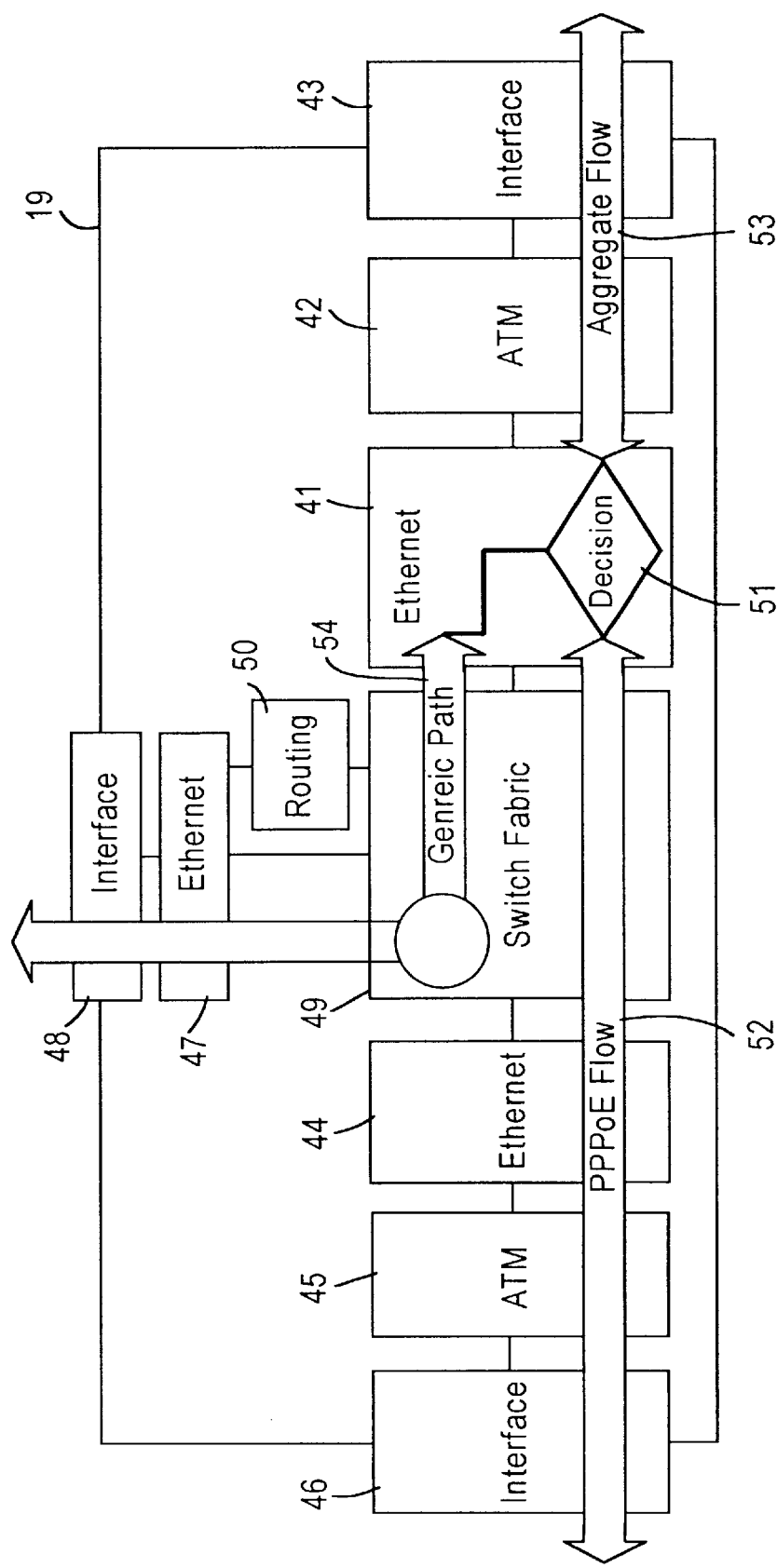
FIG. 4 is a logical diagram of the functional elements of an L3/4 switch, for use in the inventive network of FIGS. 1–3.

To fully understand an exemplary implementation of the various inventive concepts, it may be helpful to consider an ATM-based embodiment of the L3/4 switch 19. FIG. 4 is a block diagram of the elements and functions of such a preferred embodiment of the switch 19.

The preferred embodiments utilize Ethernet framing. As shown in the drawing, the switch 19 includes an Ethernet interface 41, an ATM interface 42 and an associated physical interface 43 facing toward the subscribers. In an embodiment for use in the network of FIGS. 1 and 2, the physical interface might take the form of one or more OC-3 or OC-12 links to the DSLAMs 17. These links carry all ATM cell traffic going to and from the DSLAMs and hence to and from the customer equipment served through the particular switch 19.

The switch 19 also includes an Ethernet interface 44. an ATM interface 45 and associated physical interface 46 facing toward the gateway router 29 and hence the ISPs 11. The physical interface 46 might take the form of one or more OC-12 or OC-48 links to the gateway router 29. These links carry all ATM cell traffic going to and from the ISPs or other wide area inter-networks 11. For these communications, the Ethernet interface 44 passes through PPPoE traffic, as specified by the Ethertype indicator in the cells transporting the relevant frame segments.

Facing the vertical services domain, the switch 19 includes an Ethernet interface 47 and a physical interface 48. These interfaces conform to the particular network utilized by the carrier for the vertical services domain, such as giga-bit Ethernet over wire or optical links.

The switch fabric 49 performs the physical switching of data along various paths through the switch 19, in response to instructions from a programmed routing controller 50. FIG. 4 also shows the communications flow through the switch, for each subscriber. The switch 19 also implements a Decision Point 51, shown for example within the Ethernet interface processing 41 on the subscriber facing side. At that point, the PPPoE traffic is separated from all other traffic. From that point, the PPPoE Flow 52 for each subscriber extends as a portion of the subscriber's ATM virtual circuit, facing the cell relay network and hence the ISPs 11. The PPPoE Flow 52 contains Ethernet frames that are of PPPoE Ethertype. Facing towards the subscriber premises, the switch 19 implements an Aggregate Flow path 53, in the form of another portion of the ATM virtual circuit, which contains all ingress/egress subscriber traffic. The switch implements a Generic Path 54 extending through the interfaces to the vertical services network. This path 54 carries all traffic other than PPPoE.

In this example, the switch 19 implements the Decision Point 51 based on recognition of the Ethertype indicator, which is above the layer-2 ATM cell routing information. However, the switch may implement the Decision Point 51 based on still higher-level protocol information.

In a preferred embodiment, the Ethernet and ATM interfaces 41 and 42 and the Ethernet and ATM interfaces 44 and 45 implement segmentation and reassemble (SAR) functions, essentially providing two-way conversions between ATM cell format and Ethernet frame format. Segmentation involves dividing an Ethernet frame into a number of 48-byte blocks and adding ATM headers to the blocks to form a corresponding number of ATM cells. Any blocks that do not include a complete 48-byte payload are padded as necessary. Reassembly entails receiving and buffering ATM cells until it is recognized that a complete frame has been received. The ATM headers of the cells and any padding are stripped, and the payload data is reassembled into the form of an Ethernet frame.

In such an embodiment of the switch 19, the decision point 51 determines how to selectively forward the Ethernet frame information taken from a particular series of upstream ATM cells based on the Ethernet information taken from the ATM cell payloads, for example, by examining the frame header and recognizing the particular Ethertype indicator. Internally, the actual switch fabric 49 for such an embodiment of the switch 19 would comprise an Ethernet switch, even though to other elements of the ADN network 10 the switch 19 appears to perform an ATM switching function.

Those skilled in the art will recognize however, that the decision and switch fabric may be implemented in other ways. For example, a series of cells corresponding to an Ethernet frame could be buffered and the payloads examined just to recognize and identify the Ethertype indicator, without a complete reassemble of the Ethernet frame. This later implementation therefore could utilize an ATM cell-based switch fabric.

From the discussion above, it should already be apparent that certain aspects of the invention relate to setting up logical communication circuits at a relatively low protocol layer corresponding to switching or routing functions and then segregating traffic by distinguishing communication type using higher level protocol information. To insure full understanding on these points, it may be helpful to consider the protocol layer definitions, with particular reference to the illustration of the preferred layers in FIG. 2. The International Standards Organization (ISO) Open Systems Interconnection (OSI) reference model specifies a hierarchy of protocol layers and defines the function of each layer in the network.

The lowest layer defined by the OSI model is the physical layer (L1). This layer provides transmission of raw data bits over the physical communication channel through the particular network. For example, on the subscriber lines in the preferred embodiment, the physical layer (L1) uses ADSL. Within the customer premises, communications use an Ethernet physical layer (L1), such as 10Base-T. Upstream network elements may use DS3 at some points, but most use SONET, for example OC-3 or OC-12 physical layer transport. Attention is directed to the lower half of the diagram in FIG. 2, which depicts the various protocol stacks throughout the network 10.

The layer defined by the OSI model next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. In the network 10, the data link layer (L2) is used to define certain switching functions through the network. The network layer (L3) provides capabilities required to control connections between end systems through the network, e.g., set-up and tear-down of connections.

The preferred embodiments utilize ATM cell transport as the lowest element of the data link layer (L2), for example to define the connectivity extending from the ATU-Rs 23 through the ADN network 10 to the ISP or corporate networks 11. Subscriber virtual circuits are provisioned at the ATM cell layer, that is to say at the data link layer (L2). Similarly ISP virtual circuits are provisioned at this ATM data link layer (L2), from the gateway router 29 through the cell relay network 30 to the ISP access concentrators 31. The ATM protocol therefore is the layer-2 (L2) protocol used to define the logical connectivity from the subscriber premises to the gateway router 29. The ATM protocol also is the layer-2 (L2) protocol used to define the logical connectivity from the gateway router 29 to the ISP concentrators 31.

For purposes of this discussion, higher level protocols are protocols that ride on or are encapsulated within the particular layer-2 protocol, that is to say in the payloads of the ATM cells in the preferred embodiment. Such higher level protocols include some protocols, which are often considered themselves to be level-2 protocols, where they are transported within ATM cells. The preferred embodiments use Ethernet, a local area network protocol above the ATM portion of the L2 layer. Technically, the Ethernet protocol may be considered as another L2 layer protocol. However, because it is segmented and encapsulated into the payloads of the ATM cells, the Ethernet protocol information actually is a higher level protocol information above the specific level-2 protocol (ATM) that defines the normal connectivity through the ADN network 10.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In accord with one inventive concept the network 10 actually utilizes two or more different types of protocol at levels above the protocol within the L2 layer that actually defines the network connectivity. The ADN network 10 may use different protocols at the higher layers as well. By distinguishing transmissions based on differences in these higher-level protocol types, the ATM switch 19 separately forwards different types of communication traffic for each subscriber. In the preferred embodiment, communications to and from the ISP or corporate networks 11 utilize point-to-point protocol (PPP) as the network layer (L3) protocol and a shim for transport of PPP over Ethernet (PPPoE). PPPoE, as one Ethertype protocol could also be considered as a second layer (L2) protocol albeit above the Ethernet layer itself, which in turn rides on the ATM cells used for routing at least through the permanent virtual circuit at the L2 layer.

In the illustrated implementation, however, the use of the PPPoE or a different protocol actually is an indication of a difference in type of the higher layer protocols. In the illustrated example of FIG. 2, the vertical services domain traffic utilizes Ethernet (802.3 SNAP) above the ATM adaptation layer (AAL). As noted, the presently preferred L3/4 switch 19 implements its routing decision based on recognition of the Ethertype indicator, that is to say to distinguish the PPPoE traffic from all other types of transmission from the customers' data equipment. In view of the use of ATM as the data link layer (L2) protocol of the network defining the lowest layer of network connectivity for communications services through the ADN network 10, the discrimination based on Ethernet actually implements a decision based on an effectively higher protocol layer.

IP protocol carries the actual higher-level applications information, for transport to and from the vertical services domain and for transport to and from the wide area inter-network. As such, IP and its related transport protocol referred to as the "Transmission Control Protocol" (TCP) ride on top of (are actually encapsulated within) the lower level protocol elements discussed above. Presentation and application layer elements ride on top of the IP layer. IP communication requires that each user device have an assigned IP address. IP addresses, however, are a scarce commodity. Because of the use of IP transport for both wide area services and vertical domain services, the network 10 actually may at times assign two different IP addresses to each active data communication device of an end-user, albeit on a temporary basis. The wide area communications and the vertical services network may also be viewed as two separate 'broadcast' domains.

First, the carrier operating the ADSL data network 10 and the vertical services domain network 13 will maintain a pool of local addresses for assignment, on an as-needed basis, to end user equipment 25. To the carrier, the available IP addresses are a limited resource. Accordingly, the carrier assigns IP addresses on a dynamic basis, only to those users actually on-line at any given time. The carrier preferably utilizes private network type IP addresses and dynamically administers such addresses using dynamic host configuration protocol (DHCP). DHCP is a protocol for automatic TCP/IP configuration, which enables dynamic address allocation and management.

When a particular device 25 becomes active via the ATU-R 23 and the DSLAM 17, it will activate a basic protocol stack, including an IP portion enabling communication with a DHCP server. The device will transmit an address request upstream through the network on the subscriber's virtual circuit. At the Ethernet level, this transmission appears as a broadcast message. The L3/4 ATM switch 19, however, will recognize that the packet is not a PPPoE communication and route the cells carrying the packet into the vertical services domain 13. Typically, a DHCP server is coupled to the vertical services domain network 13, for example as part of the carrier's administrative network or systems 33. The DHCP server somewhere on the vertical services domain 13, 33 will answer that broadcast request by selecting and providing an available one of the private IP addresses from the carrier's pool of available addresses. The message with the assigned address will go back to the L3/4 ATM switch 19 for insertion into the virtual circuit and transport back to the requesting device 25.

The particular end-user's device 25 uses the assigned private IP address as its source address, for all of its communications with the vertical services network 13, so long as it remains on-line for the present session. When the overall session ends and the end-user device 25 goes completely off-line, the DHCP server returns the private IP address to its pool of available addresses, for reassignment to another user as the next user comes on-line.

As noted, the user equipment 25 receives a private IP address from the DHCP server. The addresses of services on the vertical services domain also are private IP networks. Because these addresses are private, they are accessible only to equipment within that domain and the data network 10. Consequently, the devices are not accessible to hackers or the like coming in through the public Internet.

This dynamic assignment of IP addresses allows the carrier to limit the number of IP addresses used to the number of users actively connected through the ISP's host to the Internet. The use of private IP addresses allows the user equipment to communicate with the vertical services domain utilizing a normal IP-Ethernet protocol stack.

For the as-desired Internet access service, for example using a PPP or similar protocol, IP addresses are administered through the ISPs. The PPPoE protocol preserves or emulates the traditional dial-up approach to ISP access. However, the PPPoE approach does utilize Ethernet and follows Ethernet standards, for example, involving processing of certain broadcast messages.

The user can select an ISP of choice, and her data equipment 25 will initiate a selective session through the Ethernet layer on the network 10 to access the equipment 31 of the selected ISP network 11, in a manner directly analogous to a dial-up modem call through an ordinary telephone network. Hence at a time after initial activation through the networks 10 and 13, the user may activate a browser or other program for using the wide area internetwork service. This activates a second protocol stack, which includes the PPP protocol and the PPPoE shim. The user selects an ISP, and the data equipment initiates communication through the network 10 to the PPPoE equipment 31 of that ISP.

The IP addresses used by each ISP are public network type IP addresses. To the ISP, the pool of available public IP addresses also is a limited resource. Accordingly, each ISP prefers to assign IP addresses on a dynamic basis, only to those users actually on-line at any given time. Typically, as part of each initial access operation for a PPPoE session, the user's equipment 25 and the PPP terminating equipment 31 of the ISP conduct a handshaking, to establish data communications therebetween. As part of this operation, the user's device transmits a broadcast request for a public IP network. The broadcast message, in PPPoE goes through the virtual circuit to the gateway router 29 and through the router and cell relay network 30 to the ISPs PPPoE equipment 31. Although it is a broadcast message, the network effectively limits transport thereof to the virtual circuit going to the ISPs PPPoE equipment 31, that is to a domain separate from the vertical services network domain 13.

The ISP host equipment 31 initiates a procedure to assign the user's computer 25 a numeric Internet Protocol (IP) address from the pool of available public addresses and sends a PPPoE message containing that address back to the subscriber's device 25. When the session ends and the user goes off-line, the ISP host can reassign the address to another user, as the next user comes on-line.

This dynamic assignment of IP addresses allows the ISP to limit the number of public IP addresses used to the number of users actively connected through the ISP's host to the Internet. The end-user equipment will implement a second protocol stack, carrying PPPoE communications. The PPP protocol will allow the end-user equipment to obtain and utilize the public IP address for communications going to and from the public internetwork.

The switch 19 will limit transport of other types of PPPoE broadcast messages to the link to the PPPoE concentrator 31, in a manner similar to that described above for the PPPoE address request. The switch 19 also limits transport of non-PPPoE broadcast messages to the vertical services domain network 131, both for the address request message and for other types of broadcast requests. As such, the logical circuit to the PPPoE concentrator 31 becomes the conduit to one broadcast domain for upstream PPPoE messages; and the vertical services network 13 defines a second broadcast domain for upstream messages of other Ethertypes.

In addition to vertical services, the carrier continues to provide agreed access services to the equipment of the ISPs, in a manner analogous to current practices. For example, the carrier may provide its Internet access service to a subscriber on a monthly subscription basis, at one of several available rates corresponding to the grade of Internet access service (and thus the rate of communication to/from the ISP) selected by the customer's subscription.

In an enhanced service offering, the broadcast provider could offer a convenient navigation interface from a web server. The server could be on the vertical services network, but preferably is on the wide area Internet 11. With a PPPoE session active, the user can surf to the provider's server and view information about available programming. The user might select a current broadcast program by 'clicking' on a URL link in the provider's web-based information. Although provided through the wide area Internet 11, the URL would actually contain the private IP address for the desired broadcast program available from the vertical services network 13. Selection of such a URL therefore would generate a message to the appropriate server on the vertical services network 11 to initiate the above discussed procedure to allow the user to 'join' the selected broadcast. A similar methodology might also enable a provider to offer menu, selection and order/billing services from the Internet 11, to provide pay-per-view or video on-demand type services from the vertical services domain network 13.

Although IP-based, the services from the vertical services domain 13 may follow any other desirable business model. For example, a multicast service provider may contract with the carrier to provide multicast audio (radio-like) and/or video (TV-like) services via the vertical services domain. The multicast service provider, not the subscribers, would pay the carrier. The multicast service provider may offer any or all of the multicast programming to customers on some type pay-per-view basis but would likely offer most of the programming service for free or bundled in as part of some nominal monthly subscription charge. The multicast service provider instead would charge advertisers in a manner analogous to current broadcast business practices. Advertising distributed with the IP multicasting, however, can be carefully targeted at end-customers having demographic profiles meeting specific criteria specified by individual advertisers, which allows the multicast service provider to charge premium advertising rates.

Table 2 summarizes the characteristics and requirements of a number of examples of the types of vertical services that the VSD network 13 can deliver via the L3/4 ATM switch 19 and the ADSL data network 10.

TABLE 2

| Vertical Service Offering | Characteristics of the Service | Network Requirements |
|---|---|---|
| Voice Services | Local Co-Located VoIP Gateways, VoIP, Unified messaging, IP PBX, IP Centrex | Low latency, low jitter, non-correlated packet loss, and high availability |
| Video On Demand (Unicast) | Local VOD Servers or access to centralized servers. Supports whatever model of server deployment/content delivery mechanism | High bandwidth, low jitter, high availability, and low packet loss |
| Multimedia Broadcast (Multicast) | Broadcast Video; Broadcast Audio; Satellite Down Link support; Local Servers at the edge. | Varies with content type and with multicast implementation |
| Caching Services | Local servers at the insertion point, Local delivery mechanism for generic media objects such as web pages, images, video files, audio clips, software downloads, etc. | Layer 3/4 visibility |
| Distance Learning (EVC) | Integrated interactive video, voice and data | Low latency, low jitter, non-correlated packet loss, and high availability |
| Telecommuting | Closed user group with access to Transparent LAN Service (TLS). | IEEE 802.IQ |

One alternative arrangement, to that of FIG. 1, for providing DSLAM functionality is illustrated in FIG. 5. This arrangement locates a remote terminal DSLAM (RTDSLAM) 502 downstream from the central office (CO) 504, typically via an OC-12 link 506. The RTDSLAM 502 communicates with subscribers over xDSL links 510, 511 and 512. The links 510, 511 and 512 can be any of a variety of DSL services such as SDSL, HDSL, VDSL and ADSL, similar to those provided by the central office DSLAM in the earlier embodiment.

As illustrated in FIG. 5, more than one RTDSLAM 502 and 532 can communicate with a central DSLAM 534 in the CO 504, with each RTDSLAM servicing a number of different subscribers. In alternate embodiments, the central DSLAM 534 and intermediate link 540 can be omitted such that the RTDSLAMs 502 and 532 interface directly with a switch 536 in the central office 504 via links 506 and 546.

The downstream traffic from one or more Internet Service Providers (ISP) 555 over virtual circuits 550–553 are aggregated by the switch 536 over physical links 540 and 506 and are forwarded to and through the DSLAM 502. Each virtual circuit is typically limited to the rates defined in any SLAs that the carrier has with a particular customer. However, the RTDSLAM 502 can still become overburdened with traffic from all its associated virtual circuits even when each virtual circuit is within its individual limit. In such instances, the RTDSLAM 502 handles downstream traffic on a first come, first served basis resulting in some discarding of traffic for a virtual circuit that did not exceed its SLA limit. This method of discarding traffic effectively places all the traffic within, and among, the different PVCs at the same priority level with no guaranteed service quality relative to other PVC traffic arriving at the DSLAM.

By allowing the different virtual circuits through the RTDSLAM 502 to have assignable priority levels in relation to each other or by allowing the different types of traffic within a particular virtual circuit to have assignable priority levels, the invention provides a structured approach to how traffic is forwarded to a potentially overburdened RTDSLAM. As a result, different tiers of service can be guaranteed for downstream traffic through an RTDSLAM.

Figure 6A:
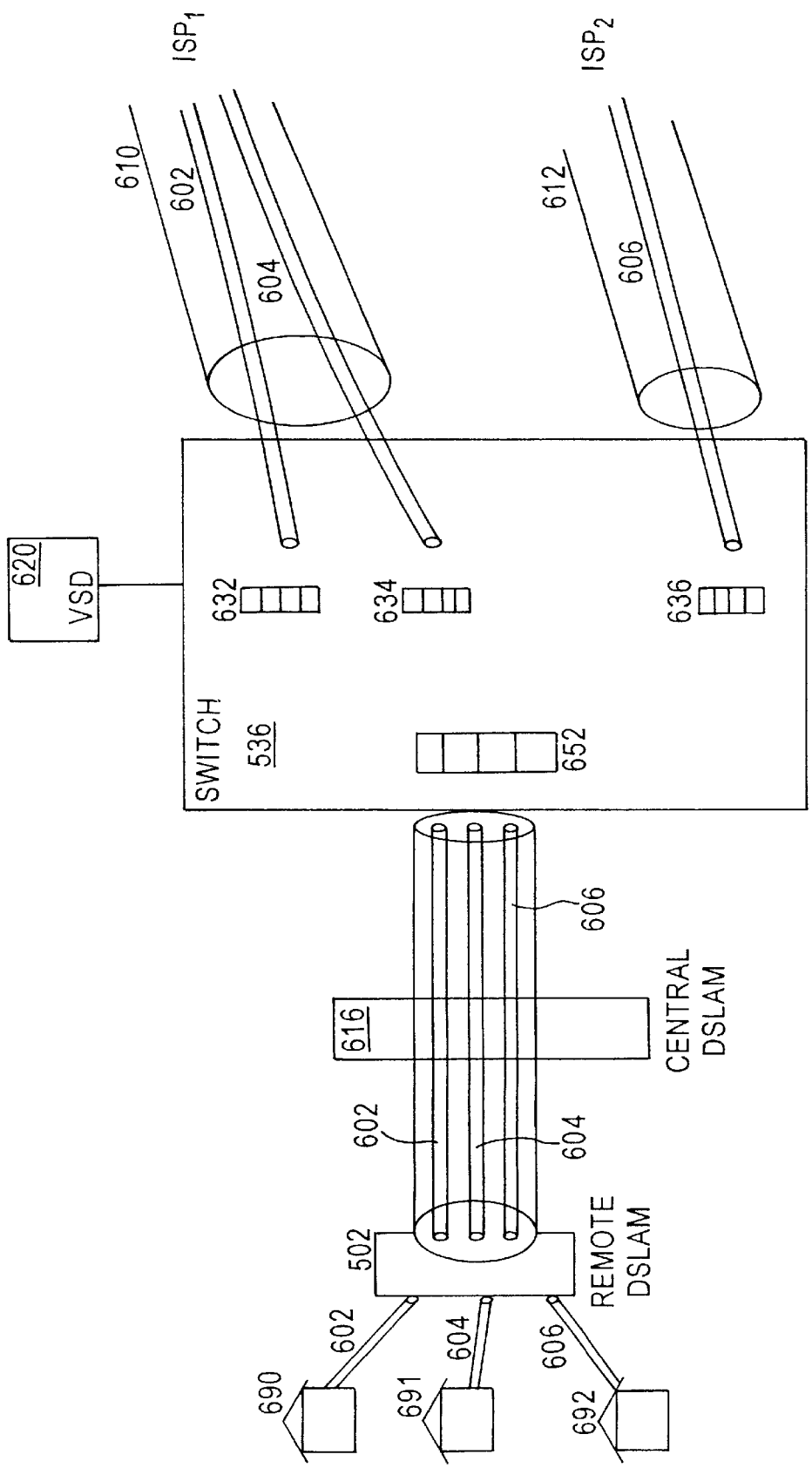
FIG. 6A is a block diagram of a portion of the network of FIG. 5, showing a two-tier queue structure in a vertical services switch.

FIG. 6A illustrates a detailed view of a portion of the ADN between the VSI switch 536 and the subscriber's equipment, in which an RTDSLAM 502 is used for connecting to the subscriber equipment 690, 691 and 692.

Three permanent virtual circuits (PVCs) 602, 604 and 606 are illustrated in FIG. 6A, with each PVC carrying the communications between a subscriber and their ISP. As illustrated, two of the PVCs 602 and 604 connect to the same $ISP_1$ and may be physically carried on the same DS-3 link 610, for example. The other PVC 606 can connect to a different $ISP_2$ also via a DS-3, or other, link 612.

As previously described, the downstream traffic in the PVCs 602, 604 and 606 is switched through the VSI switch 536 and forwarded to a central DSLAM 616. The downstream ISP traffic is also combined, as needed, with data from the vertical services domain 620 by inserting, at the switch 536 any vertical services data into the appropriate PVC 602, 604 and 606. From the central DSLAM 616, the PVCs 602, 604 and 606 are aggregated over a high-speed link 506 and sent to the RTDSLAM 502. From the RTDSLAM 502, each PVC 602, 604 and 606 is carried to a subscriber 690, 691 and 692 over an xDSL link.

As described in relation to providing QoS for the data from the vertical services domain, the switch 536 includes multiple sets of queues 632, 634 and 636 for each PVC 602, 604, and 636, respectively. Each set of queues 632, 634 and 636 are shown as having four separate queues in order to maintain consistency with previously described queue structures and corresponding types of service. As noted in that previous discussion, having four different queues is merely an exemplary structure and other numbers of queues can also be implemented.

As previously noted, the presence of the queue sets 632, 634 and 636 provides a way to prioritize downstream traffic within a PVC arriving at the switch 536 from the vertical services domain 620. In addition, these queue sets 632, 634 and 636 can be used to provide a method of prioritizing downstream traffic within a PVC arriving at the switch 536 from an ISP.

A subscriber, for example 690, may want to ensure his downstream traffic has a relatively higher priority than other subscribers' downstream traffic that is also passing through the RTDSLAM 502. Alternatively, or in conjunction, the subscriber 690 may be a business that places more importance on data services from the ISP than video services from the ISP, or from the vertical services domain 620, and may, therefore, want to prioritize data traffic accordingly. Other subscribers can have different priorities in relation to the various voice, data, and video services being delivered from their ISPs and the vertical services domain. By controlling the manner in which downstream data from the ISP within a particular PVC, and among different PVCs, is queued in the switch 536, different grades of service, or tiers of quality, can be offered to subscribers.

Similar to the prioritizing of vertical services data into Control/High/Medium/low queues, as described earlier in relation to Table 1, downstream traffic in a PVC 602 from an ISP can be prioritized into the different queues according to agreed upon service levels associated with different types of traffic coming from the ISP. Preferably, the prioritization is based on information from protocol layers above the layer 2 protocol defining the switched connectivity through the network (e.g., in this embodiment, above the ATM cell layer). Based on the type of traffic in particular cells or frames within PVC 602 and an agreed upon prioritization rule-set for that subscriber 690, downstream ISP traffic within the PVC 602 is appropriately distributed among the four queues 632. In normal operation, a complete respective frame containing data from all the cells transporting that frame, is placed in the appropriate ingress queue as it is received, and the switch reads data from the ingress queue to move the frame (i.e., all the corresponding cells) to the appropriate egress queue.

However, unlike the typical Ethernet traffic received from the vertical services domain 620, the traffic arriving at the switch 536 from an ISP is typically ATM cells which the switch 536 re-assembles into Ethernet frames. As ATM cells, the traffic type (e.g., video, data, voice etc.) of the arriving traffic is difficult to determine and, therefore, makes prioritizing the traffic based on traffic type just as difficult. Accordingly, the switch 536 can re-assemble the arriving cells into higher-level frames and packets, for example layer 3 or layer 4 packets, so that the traffic type can be easily identified and prioritization of the cells into the different queues can be accomplished at the frame level. This re-assembly into higher level frames can be semi-permanent so that the frame is switched through the switch fabric of the switch 536 as the higher level frame and then disassembled into ATM cells before being transmitted from the switch's downstream side. Alternatively, this re-assembly could be temporary and only to the extent needed to identify the appropriate upper-layer information; and the switch 536, therefore, would be configured to queue and switch ATM cells through its fabric.

As just described, the downstream ISP traffic within a particular PVC can be examined at a higher protocol level and prioritized based on a queuing strategy in accordance with a selected grade of service for different traffic types within that PVC. However, the queues 632, 634 and 636 do not accomplish prioritizing traffic among different PVCs.

A queuing structure with two tiers can be used to provide prioritization between the different PVCs 602, 604 and 606. The first tier comprises the queue sets 632, 634 and 636 for the individual subscriber PVCs. The second tier comprises a queue set 652 of prioritized queues for the link from the switch 536 to the RTDSLAM 502. The second tier queue 652 receives cells from the individual PVC queues 632, 634 and 636. In a preferred embodiment, the queue 652 also has a four-queue structure that is serviced according to any of the many conventional methods, as described earlier, based on the capacity of the downstream facility. For ease of reference, the queues 632, 634 and 636 can be referred to as ingress queues and the queue 652 can be referred to as the egress queue. The prioritization of traffic between the different PVCs 602, 604 and 606 is accomplished according to how the ingress queues 632, 634, and 636 are serviced in order to populate the egress queue 652.

A preferred method for servicing the ingress queues, is to utilize access control lists (ACLs) that depend on a specified tier of service for a PVC in relation to other PVCs passing through the same RTDSLAM. An ACL is considered to be a rule-set that describes how queue entries from a particular PVC's ingress queue set (for example 632) are forwarded to the egress queue 652. An exemplary ACL, therefore, would identify those PVCs 602, 604 and 606 that utilize the same RTDSLAM 502 and a relative level of quality associated with each of those PVCs and/or the specific services within the PVCs. In one embodiment, using predetermined knowledge regarding the likely capacity of the RTDSLAM 502, the switch 536 would service each of the ingress queue sets 632, 634 and 636 based on the relative priorities as indicated by the ACL, in order to populate the egress queue 652. As a result of this two-tier queue structure, prioritization of downstream traffic can be accomplished not only within a PVC but also between different PVCs.

The rate of servicing the egress queue 652 can be regulated so as to limit the downstream traffic to a capacity that a downstream RTDSLAM can handle. Within the RTDSLAM there are buffers which handle one or more PVCs going to one or more CPE devices. The switch 536 is able to automatically determine, or is programmed with information relating to, a buffer size associated with each PVC in the RTDSLAM. The servicing algorithms for the ingress queues 632, 634 and 636 and egress queues 652 are performed by the switch 536 so as not to exceed the buffer capacity of a buffer in the RTDSLAM. By limiting the traffic in this manner the number of cells dropped by the RTDSLAM can be reduced. A greater benefit, however, is that if cells need to be dropped, then the selection of dropped cells can effectively be performed at the switch based on relative priority of the cells. Furthermore, because the switch can view data in the context of frames, as opposed to just cells, reduction in the number of cells passing through an RTDSLAM can be accomplished by the switch dropping a single frame of multiple cells rather than the RTDSLAM randomly dropping a cell from a number of different frames. Random cell loss randomizes the impact on larger, multi-cell frames. Dropping even a single cell from a frame typically results in loss and retransmission of the whole frame; accordingly, even though downstream traffic may be limited (i.e., shaped) by the switch in the present invention, the actual throughput through the RTDSLAM is improved by reducing the random nature in which cells are dropped and frames retransmitted at the RTDSLAM.

Figure 6B:
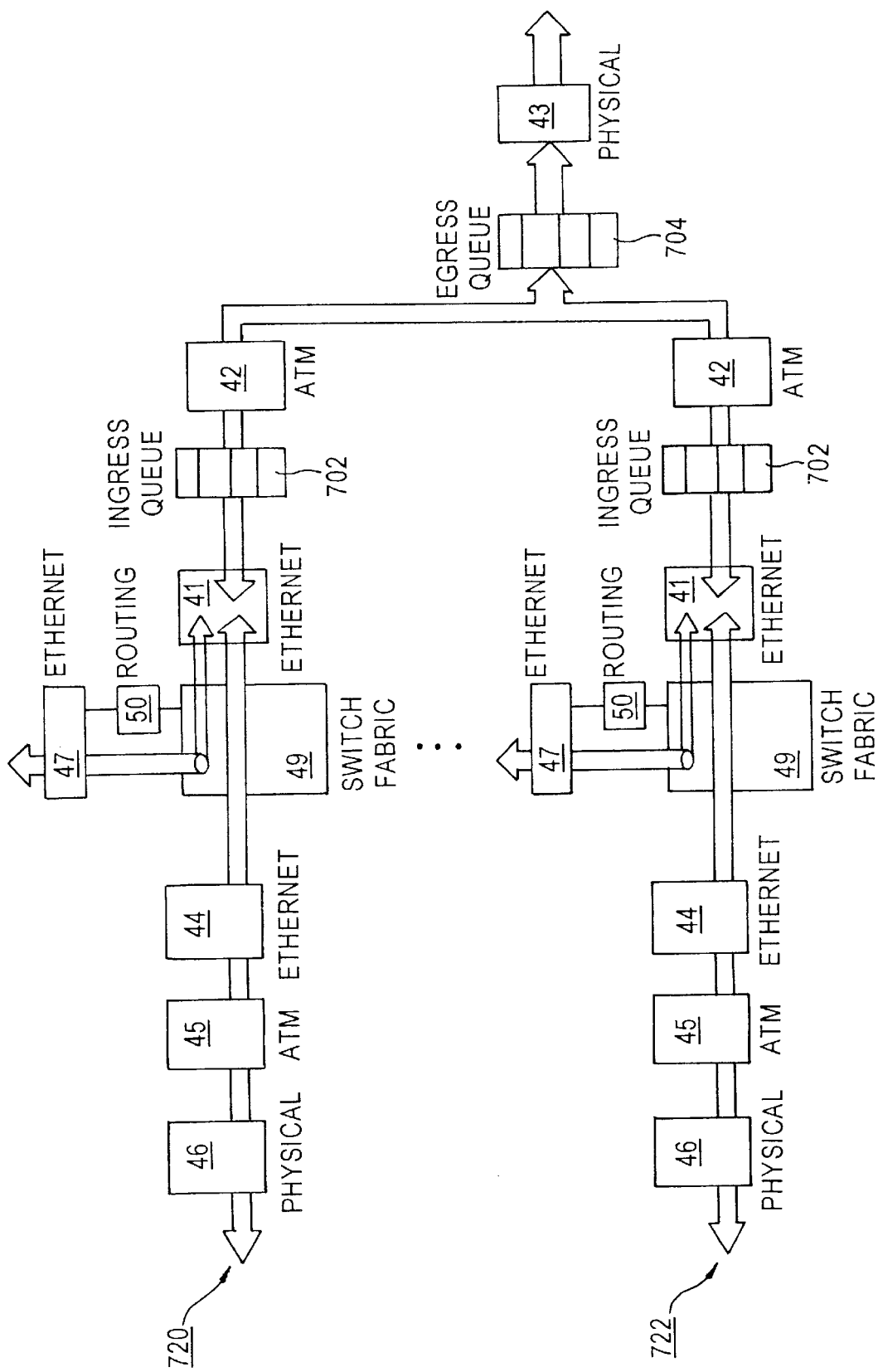
FIG. 6B is a logical view of the different permanent virtual circuits switched through the vertical services switch of FIG. 6A.

FIG. 6B illustrates a modified version of the logical view of the VSI switch 19 depicted in FIG. 4. In FIG. 6B, two of the many possible PVCs 720 and 722 through the switch are logically depicted as well as the functional elements for processing those PVCs. In addition to the elements of the switch 19 already described in relation to FIG. 4, each PVC 720 and 722 has an ingress queue set 702. The switch 19 also maintains an egress queue 704 populated from the individual ingress queues 702. The remaining elements illustrated in FIG. 6B are identical in name and function to those described in relation to FIG. 4 and, therefore, a redundant description of these elements will be avoided.

In each PVC flow 720 and 722 through the switch 19, a set of ingress queues 702 is provided that prioritizes downstream data according to a level of service rule-set applied to the downstream traffic when examined at a layer above the ATM layer. Both the downstream traffic from the vertical services domain and the downstream traffic from the ISP domain can be queued in the egress queue set 704 according to a predetermined SLA. The downstream ATM traffic generated from each of the ingress queues 702 of the different PVCs is then prioritized into egress queue 704 according to an ACL that controls the servicing of the ingress queues 702 by specifying relative priorities of the different PVCs 720 and 722 that are destined for the same RTDSLAM. Accordingly the modified switch of FIG. 7B and its two-tier queuing structure allows prioritization of down stream traffic within each PVC 720 and 722, for example, and among the different PVCs being switched through the switch 19.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method for queuing downstream traffic in a data communications network in order to prioritize the downstream traffic according to tiers of service, comprising the steps of:
   receiving a plurality of frames destined for subscriber equipment, each of said plurality of received frames associated with one of a plurality of logical communications pipes, and each of said plurality of logical communications pipes having an associated level of quality and an associated set of ingress queues;
   queuing each one of the plurality of received frames, based on information within that one frame, in a particular queue within the set of ingress queues that correspond to the logical communications pipe associated with that one frame, wherein each queue within each of the sets of ingress queues has a first associated priority level;
   servicing the plurality of sets of ingress queues based on at least one of the first associated priority levels of each queue within each of the plurality of sets of ingress queues and the level of quality associated with each of the sets of ingress queues, to populate a set of egress queues, each queue within the set of egress queues having a second associated priority level; and
   servicing each queue of the set of egress queues based on the second associated priority level of each queue, to provide downstream traffic prioritized into different tiers of service.

2. The method according to claim 1, further comprising the step of:
   determining data within each of the plurality of received frames relating to a network protocol layer above the data-link layer and wherein the queuing of each received frame is based on the determined data for that frame.

3. The method according to claim 2, wherein the determined data identifies a type of service associated with each of the plurality of received frames.

4. The method according to claim 1, wherein the servicing of the plurality of sets of ingress queues is based on a temporary storage capacity, in one or more downstream facilities, associated with each of the logical communications pipes.

5. A method for queuing downstream traffic destined for a remote terminal DSLAM, comprising the steps of:
   receiving a plurality of frames, each frame associated with one of a plurality of virtual circuits, each of said plurality of virtual circuits having a corresponding level of service and a corresponding set of ingress queues wherein each of said plurality of received frames is thereby associated with a set of ingress queues;
   based on data within each of the plurality of received frames, placing each of the plurality of received frames in a particular one of the queues within the set of ingress queues that correspond to the virtual circuit associated with that frame, each of queues within each of the sets of ingress queues having a corresponding priority level;
   servicing the plurality of sets of ingress queues based on at least one of the associated priority levels of the queues within each of the sets of ingress queues and the corresponding level of service of each of the sets of ingress queues, to populate a set of egress queues with the plurality of received frames, each of the queues within the set of egress queues having an associated priority level; and
   servicing the set of egress queues according to the corresponding priority levels of the queues within the set of egress queues to generate traffic destined for the remote terminal DSLAM.

6. The method according to claim 5, wherein the data within each of the received plurality of frames relates to one of network-layer and transport-layer information.

7. The method according to claim 5, wherein the data within each of the received plurality of frames relates to a type of service associated with that frame.

8. The method according to claim 7, wherein the type of service is one of video service, data service and voice service.

9. The method according to claim 5, wherein each of the received plurality of frames is received from one of an internet services domain and a vertical services domain.

10. The method according to claim 5, wherein the servicing of the plurality of sets of ingress queues is based on a data buffering capacity, in the remote terminal DSLAM, associated with each of the virtual circuits.

11. A data switch for use in a communications network, comprising:
    a first interface, for communication with a first network domain via a plurality of virtual circuits, each virtual circuit having a corresponding level of service;
    a second interface, for data communication to and from data equipment at a plurality of customer premises via the plurality of virtual circuits;
    a switch fabric coupled to the interfaces and configured to forward downstream data from the first interface to the second interface according to the plurality of virtual circuits;
    a plurality of sets of first-tier queues coupled with the first interface, each of said sets of first-tier queues associated with one of the plurality of virtual circuits and each of said sets comprising a first plurality of queues, each of said first plurality of queues having an associated priority level;
    a second-tier queue set coupled with the second interface and comprising a second plurality of queues each of said second plurality of queues having an associated priority level; and
    a switch controller configured to:
    place each particular frame of a plurality of frames, associated with a corresponding one of the plurality of virtual circuits, received at the first interface from the first network domain, into a one of the first plurality of queues within one set of first-tier queues associated with that corresponding one virtual circuit, based on information within each said particular frame;

service each of the sets of first-tier queues, to populate the second plurality of queues within the second-tier queue set, according to at least one of:
  a) the associated priority levels of the first plurality of queues within that set of first-tier queues, and
  b) the corresponding level of service of the virtual circuit associated with that set of first-tier queues; and service the second-tier queue set according to the associated priority levels of the second plurality of queues within the second-tier queue set, to generate traffic for transmission via the second interface.

12. The switch according to claim 11, further comprising:
an access control list that identifies the corresponding level of service for each virtual circuit.

13. The switch according to claim 11, further comprising:
a third interface for communication with a second network domain and coupled with the plurality of sets of first-tier queues; and
wherein said switch controller is further configured to:
  insert each of a plurality of frames from the second network domain, received via the third interface, into a specific virtual circuit by placing each of the plurality of frames from the second network domain into one of the first plurality of queues within a set of first-tier queues associated with that specific virtual circuit, based on information within each of the plurality of frames from the second network domain.

14. The switch according to claim 13, wherein the first network domain comprises an internet services domain and the second network domain comprises a vertical services domain.

15. The switch according to claim 11, wherein the information within each said particular frame relates to a network protocol layer above a data-link layer.

16. The switch according to claim 11, wherein the information within each said particular frame indicates a type of service associated with that particular frame.

17. The switch according to claim 16, wherein the type of service is one of voice service, data service, and video service.

18. In an access data network, comprising:
a communication access node coupled to a wide area internetwork;
a plurality of digital subscriber line transceivers coupled to network ends of subscriber lines, for data communication with transceivers coupled to respective customer premises ends of respective subscriber lines;
an access switch coupled for data communications with the digital subscriber line transceivers, for receiving data from customer premises equipment via respective ones of the digital subscriber line transceivers and for supplying data intended for transmission to predetermined customer premises equipment to the respective ones of the digital subscriber line transceivers;
a remote terminal DSLAM between the access switch and the plurality of digital subscriber transceivers, said remote terminal DSLAM including a plurality of buffers, each buffer associated with one or more of the subscriber lines;
a high-speed data link between the access switch and the communication access node;
a local services network coupled locally to the access switch, wherein the access switch segregates upstream traffic from the respective customer premises equipment between the local services network and the high-speed data link to the communication access node, and the access switch aggregates downstream traffic from the local services network and the high-speed data link from the communication access node for transmission to the respective customer premises equipment, a method of providing different tiers of quality to the different subscriber lines, each different subscriber line having an associated set of similar ingress queues, the method comprising the steps of:
  queuing the aggregated downstream traffic in each of the different subscriber lines into one of a plurality of queues within the set of ingress queues associated with that subscriber line, based on a type of service associated with the aggregated downstream traffic;
  populating a set of egress queues with the aggregated downstream traffic from all of the different subscriber lines by servicing the different sets of ingress queues according to at least one of a priority level associated with each of the plurality of queues within the different sets of ingress queues and a level of quality associated with each of the different sets of ingress queues; and
  servicing the set of egress queues according to a priority level associated with each of the queues within the set of egress queues to generate downstream traffic through the RTDSLAM having different tiers of quality.

19. The method according to claim 18, wherein:
services are provided through the access data network to customer premises equipment of each customer via a logical circuit provisioned through the access data network, the logical circuit extending from the customer premises equipment of each customer to the communication access node via the access switch and the high-speed data link, and
the logical circuit comprises a layer-2 protocol logical communication circuit provisioned through the access switch and the high-speed data link.

20. The method according to claim 19, wherein the layer-2 protocol logical communication circuit comprises an Asynchronous Transfer Mode (ATM) virtual circuit.

21. The method according to claim 19, wherein the logical circuit has a corresponding level of quality.

22. The method according to claim 18, further comprising the steps of:
  determining a data capacity of each of the plurality of buffers; and
  servicing each of the different sets of ingress queues according to the determined data capacity of the buffer associated with the subscriber line corresponding to that set of ingress queues.

* * * * *